US010924386B2

(12) United States Patent
Davie et al.

(10) Patent No.: US 10,924,386 B2
(45) Date of Patent: *Feb. 16, 2021

(54) DATABASE PROTOCOL FOR EXCHANGING FORWARDING STATE WITH HARDWARE SWITCHES

(71) Applicant: Nicira, Inc., Palo Alto, CA (US)

(72) Inventors: Bruce Davie, Melbourne (AU); Anupam Chanda, San Jose, CA (US); Benjamin L. Pfaff, Redwood City, CA (US); Justin Pettit, Los Altos Hills, CA (US); Amar Padmanabhan, Menlo Park, CA (US)

(73) Assignee: NICIRA, INC., Palo Alto, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/179,982

(22) Filed: Nov. 4, 2018

(65) Prior Publication Data
US 2019/0089622 A1    Mar. 21, 2019

Related U.S. Application Data

(63) Continuation of application No. 15/640,934, filed on Jul. 3, 2017, now Pat. No. 10,153,965, which is a
(Continued)

(51) Int. Cl.
*H04L 12/761* (2013.01)
*H04L 12/46* (2006.01)
(Continued)

(52) U.S. Cl.
CPC .............. *H04L 45/16* (2013.01); *G06F 9/455* (2013.01); *G06F 9/45533* (2013.01);
(Continued)

(58) Field of Classification Search
CPC .................................................. H04L 12/2878
See application file for complete search history.

(56) References Cited

U.S. PATENT DOCUMENTS 5,526,484 A    6/1996   Casper et al.
5,751,967 A    5/1998   Raab et al.
(Continued)

FOREIGN PATENT DOCUMENTS

EP    1154601 A1    11/2001
EP    1653688 A1    5/2006
(Continued)

OTHER PUBLICATIONS

Al-Fares, Mohammad, et al., "A Scalable, Commodity Data Center Network Architecture," SIGCOMM '08, Aug. 17-22, 2008, 12 pages, Seattle, Washington, USA.
(Continued)

*Primary Examiner* — Esther B. Henderson
(74) *Attorney, Agent, or Firm* — Adeli LLP

(57) ABSTRACT

Some embodiments provide a set of one or more network controllers that communicates with a wide range of devices, ranging from switches to appliances such as firewalls, load balancers, etc. The set of network controllers communicates with such devices to connect them to its managed virtual networks. The set of network controllers can define each virtual network through software switches and/or software appliances. To extend the control beyond software network elements, some embodiments implement a database server on each dedicated hardware. The set of network controllers accesses the database server to send management data. The hardware then translates the management data to connect to a managed virtual network.

20 Claims, 21 Drawing Sheets

Related U.S. Application Data continuation of application No. 14/069,292, filed on Oct. 31, 2013, now Pat. No. 9,699,070.

(60) Provisional application No. 61/887,117, filed on Oct. 4, 2013.

(51) Int. Cl.
*G06F 9/455* (2018.01)
*H04L 12/721* (2013.01)
*H04L 29/06* (2006.01)
*H04L 12/24* (2006.01)

(52) U.S. Cl.
CPC .......... *H04L 12/46* (2013.01); *H04L 12/4641* (2013.01); *H04L 45/14* (2013.01); *H04L 63/00* (2013.01); *H04L 41/0893* (2013.01); *H04L 41/28* (2013.01); *H04L 41/5096* (2013.01)

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 7,933,198 B1 | 4/2011 | Pan |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,178,833 B2 | 11/2015 | Koponen et al. |
| 9,306,843 B2 | 4/2016 | Koponen et al. |
| 9,319,375 B2 | 4/2016 | Gross et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 10,200,343 B2 | 2/2019 | Chanda et al. |
| 10,230,576 B2 | 3/2019 | Chanda et al. |
| 10,250,553 B2 | 4/2019 | Chanda et al. |
| 10,263,828 B2 | 4/2019 | Chanda et al. |
| 10,313,186 B2 | 6/2019 | Wang et al. |
| 10,411,912 B2 | 9/2019 | Chanda et al. |
| 10,447,618 B2 | 10/2019 | Chanda |
| 10,554,484 B2 | 2/2020 | Chanda et al. |
| 10,659,431 B2 | 5/2020 | Basler |
| 2002/0001310 A1* | 1/2002 | Mai ..................... H04L 12/1836 370/390 |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0037279 A1* | 2/2004 | Zelig .................. H04L 12/4633 370/390 |
| 2004/0052216 A1 | 3/2004 | Roh |
| 2004/0267866 A1 | 12/2004 | Carollo et al. |
| 2005/0163115 A1* | 7/2005 | Dontu ..................... H04L 45/18 370/389 |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2007/0115961 A1* | 5/2007 | Dorenbosch ........ H04L 65/4076 370/389 |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0158086 A1* | 6/2011 | Sakauchi ................ H04L 12/42 370/225 |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0147898 A1 | 6/2012 | Koponen et al. |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0054773 A1 | 2/2013 | Onoue |
| 2013/0058208 A1 | 3/2013 | Pfaff et al. |
| 2013/0058225 A1 | 3/2013 | Casado et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1 | 12/2013 | Bao et al. |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2014/0348161 A1 | 11/2014 | Koponen et al. |
| 2014/0362775 A1 | 12/2014 | Steiner et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0103838 A1 | 4/2015 | Zhang et al. |
| 2015/0124586 A1 | 5/2015 | Pani |

(56) References Cited

U.S. PATENT DOCUMENTS

| | | |
|---|---|---|
| 2015/0124809 A1 | 5/2015 | Edsall et al. |
| 2015/0124821 A1 | 5/2015 | Chu et al. |
| 2015/0195178 A1 | 7/2015 | Bhattacharya et al. |
| 2015/0215189 A1 | 7/2015 | Lim |
| 2015/0281075 A1 | 10/2015 | Park et al. |
| 2015/0326425 A1 | 11/2015 | Natarajan et al. |
| 2015/0326524 A1 | 11/2015 | Tankala et al. |
| 2015/0372906 A1 | 12/2015 | Tirat |
| 2015/0379150 A1 | 12/2015 | Duda |
| 2016/0014039 A1 | 1/2016 | Reddy et al. |
| 2016/0014073 A1 | 1/2016 | Reddy et al. |
| 2016/0173535 A1 | 6/2016 | Barabash et al. |
| 2016/0197824 A1 | 7/2016 | Lin et al. |
| 2016/0212222 A1 | 7/2016 | Bultema et al. |
| 2016/0232019 A1 | 8/2016 | Shah et al. |
| 2016/0308690 A1 | 10/2016 | Chanda et al. |
| 2016/0352633 A1 | 12/2016 | Kapadia et al. |
| 2016/0380812 A1 | 12/2016 | Chanda et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 | 3/2017 | Uttaro et al. |
| 2017/0093758 A1 | 3/2017 | Chanda |
| 2017/0126615 A1 | 5/2017 | Chanda et al. |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1 | 7/2017 | Kirby et al. |
| 2017/0272316 A1 | 9/2017 | Johnson et al. |
| 2017/0317928 A1 | 11/2017 | Gude et al. |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1 | 1/2018 | Wang et al. |
| 2018/0183730 A1 | 6/2018 | Chanda |
| 2018/0219699 A1 | 8/2018 | Chanda et al. |
| 2018/0241622 A1 | 8/2018 | Chanda et al. |
| 2018/0241672 A1 | 8/2018 | Chanda et al. |
| 2018/0248796 A1 | 8/2018 | Chanda et al. |
| 2019/0141011 A1 | 5/2019 | Basler |
| 2019/0207904 A1 | 7/2019 | Chanda et al. |
| 2019/0238393 A1 | 8/2019 | Chanda et al. |
| 2019/0260637 A1 | 8/2019 | Wang et al. |
| 2019/0356512 A1 | 11/2019 | Chanda et al. |
| 2020/0021541 A1 | 1/2020 | Chanda |

FOREIGN PATENT DOCUMENTS

| | | |
|---|---|---|
| JP | 2003069609 A | 3/2003 |
| WO | 2005112390 A1 | 11/2005 |
| WO | 2008095010 A1 | 8/2008 |

OTHER PUBLICATIONS

Graubner, Pablo, et al., "Cloud Computing: Energy-Efficient Virtual Machine Consolidation," IT Professional, Mar. 2013, 7 pages, vol. 15, Issue 2, IEEE.

Pfaff, Ben, et al., "The Open vSwitch Database Management Protocol," draft-pfaff-ovsdb- proto-00, Aug. 20, 2012, 34 pages, Nicira, Inc., Palo Alto, California, USA.

\* cited by examiner

DATABASE PROTOCOL FOR EXCHANGING FORWARDING STATE WITH HARDWARE SWITCHES

CLAIM OF BENEFIT TO PRIOR APPLICATIONS

This application is a continuation of U.S. patent application Ser. No. 15/640,934, filed Jul. 3, 2017, now published as U.S. Patent Publication 2017/0366446. U.S. patent application Ser. No. 15/640,934 is a continuation of U.S. patent application Ser. No. 14/069,292, filed Oct. 31, 2013, now issued as U.S. Pat. No. 9,699,070. U.S. patent application Ser. No. 14/069,292 claims the benefit of U.S. Provisional Patent Application 61/887,117, entitled "Managing Software and Hardware Forwarding Elements to Define Virtual Networks", filed Oct. 4, 2013. U.S. Provisional Patent Application 61/887,117 and U.S. patent application Ser. Nos. 14/069,292 and 15/640,934 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Three of the many challenges of large networks (including datacenters and the enterprise) are scalability, mobility, and multi-tenancy and often the approaches taken to address one hamper the other. Currently, instead of a hardware switch, an extender or a L2 gateway is used to bridge the physical network to the virtual network. For instance, the L2 gateway may be used to connect two managed environments, or connect a managed environment and an unmanaged environment. The extender is an x86 box. As such, its throughput is less than dedicated hardware. The extender also introduces one extra hop that can hinder performance and latency.

BRIEF SUMMARY

Some embodiments provide a set of one or more network controllers that communicates with a wide range of devices (e.g., third-party hardware), ranging from switches to appliances such as firewalls, load balancers, etc. The set of network controllers communicates with such devices to connect them to its managed virtual networks. The set of network controllers can define each virtual network through software switches and/or software appliances. To extend the control beyond software network elements, some embodiments implement a database server on dedicated hardware and control the hardware through the database server using a database protocol. For instance, the set of network controllers accesses the database server to send management data. The hardware then translates the management data to connect to a managed virtual network.

In some embodiments, the database server is designed to handle transactions and deal with conflicts in having multiple writers (e.g., more than one network controllers writing to a database). As an example, for a given transaction, the database server of some embodiments executes a set of operations on a database. When there are multiple operations, the database server may execute each operation in a specified order, except that if an operation fails, then the remaining operations are not executed. The set of operations is executed as a single atomic, consistent, isolated transaction. The transaction is committed only if each and every operation succeeds. In this manner, the database server provides a means of transacting with a client that maintains the reliability of the database even when there is a failure in completing each operation in the set of operations.

To prevent multiple clients writing to the database at the same time, the database server may support various lock operations to lock or unlock the database. In some embodiments, each client must obtain a particular lock from the database server before the client can write to a certain table of the database. The database will assign the client ownership of the lock as soon as it becomes available. When multiple clients request the same lock, they will receive it in first-come, first served order. After receiving the lock, the client can then write to the database and release the lock by perform an unlock operation.

In some embodiments, the database server supports bi-directional asynchronous notifications. For example, when there is an update to a database table, the database server sends a notification regarding an update to a client (e.g., executing on a network controller or on the hardware). The notification may include a copy of the table or a subset of the table (e.g., a record) that was updated. In some embodiments, the protocol's update call is used to exchange forwarding state. For instance, if the hardware is a switch, it can publish its forwarding state by having its database client write (e.g., a learned MAC address) to a database table. This will in turn cause the database server to push the update to a database client executing on a network controller. The network controller can then notify other network elements (e.g., the software switches) regarding the update. When a network controller is notified of an update to a software switch, the network controller's client accesses the database server executing on the hardware switch to write to a database table. This will in turn cause the database server to push the update to the database client executing on the hardware switch. The hardware switch's software stack can then translate the update to a flow that it understands to process packets.

The database server of some embodiments maintains a database by performing garbage collection operations to remove database entries (e.g., records) that are not used. In some embodiments, the garbage collection is performed at runtime (e.g., with each given transaction), performed periodically (e.g., at set interval as a background task), or performed when triggered (e.g., when there is a change to the database or a change to a particular table of the database). In some embodiments, if a table entry (e.g., a record) is not part of a root set and the entry has no reference or a reference of a particular importance (e.g., a strong reference), then the table entry is subject to garbage collection. The garbage collection process prevents the database from continually growing in size over time with unused data.

Some embodiments provide a network controller that manages software and hardware switching elements. The network controller sends management data to the hardware switching element using a protocol to add the hardware switching element to a virtual network. To manage traffic between the hardware and software switching element, the network controller exchanges forwarding states with the hardware switching element through the protocol's asynchronous notification. The forwarding state of the software switching element is asynchronously sent from the network controller to the hardware switching element when the software's forwarding state has changed. The forwarding state of the hardware switching element is asynchronously received at the network controller from the hardware switching element when the hardware's forwarding state has changed.

The network controller of some embodiments facilitates in implementing a logical switching element from software and hardware switching elements. In facilitating, the network controller sends a first transaction that instructs a database server on the hardware switching element to write to a database a logical forwarding element identifier (LFEI) that identifies a logical switch. The network controller sends a second transaction that instructs the database server on the hardware switching element to write to the database an address of at least one software switching element that use the LFEI. The hardware switching element uses the address to establish a tunnel between the hardware switching elements and the software switching element. The hardware and software switching elements implements the logical switching element by sending packets over the established tunnel using the LFEI.

Embodiments described herein provide a system for controlling forwarding elements. The system includes a network controller (e.g., that operates on a computing device) to generate and send forwarding instructions to several forwarding elements in a virtual network, including software and hardware forwarding elements. The system includes a service node (e.g., that operates on another computing device or the same computing device) to (1) receive, based on the forwarding instructions, each unknown unicast packet from a software or a hardware forwarding element in the plurality of forwarding elements, (2) replicate the packet, and (3) send the packet to each other hardware forwarding element. The unknown unicast packet is sent to each particular hardware forwarding element in the virtual network so that the particular hardware forwarding element identifies whether a machine connected to the hardware forwarding element's port has the same address as the destination address associated with the packet, and output the packet to the port if the addresses are the same. For example, to find a matching address, the hardware forwarding element may flood some or all of its ports and record the MAC address of the packet that responds to the flood.

In some embodiments, the service node receives, based on the forwarding instructions from the network controller, each multicast packet from a software or a hardware forwarding element. The service node then replicates the packet and sends the packet to each other hardware forwarding element. The multicast packet is sent to each particular hardware forwarding element in the virtual network so that the particular hardware forwarding element identifies whether a machine connected to the hardware forwarding element's port is a part of the virtual network, and output the packet to the port if the machine is a part of the virtual network.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Embodiments described herein provide a set of one or more network controllers that communicates with a wide range of devices (e.g., third-party hardware), ranging from switches to appliances such as firewalls, load balancers, etc. The set of network controllers communicates with such devices to connect them to its managed virtual networks. The set of network controllers can define each virtual network through software switches and/or software appliances. To extend the control beyond software network elements, some embodiments implement a database server on dedicated hardware and control the hardware through the database server using a database protocol. For instance, the set of network controllers accesses the database server to send management data. The hardware then translates the management data to connect to a managed virtual network.

In some embodiments, the database server is designed to handle transactions and deal with conflicts in having multiple writers (e.g., more than one network controllers writing to a database). As an example, for a given transaction, the database server of some embodiments executes a set of operations on a database. When there are multiple operations, the database server may execute each operation in a specified order, except that if an operation fails, then the remaining operations are not executed. To prevent multiple clients writing to the database at the same time, the database server may support various lock operations to lock or unlock the database.

The database server of some embodiments supports other types of calls (e.g., remote procedure calls) using the database protocol, including an update notification. When there is an update to a database table, the database server sends a notification regarding an update to a client (e.g., executing on a network controller or on the hardware). The notification may include a copy of the table or a subset of the table (e.g., a record) that was updated. In some embodiments, the protocol's update call is used to exchange management data and forwarding state.

Figure 1:
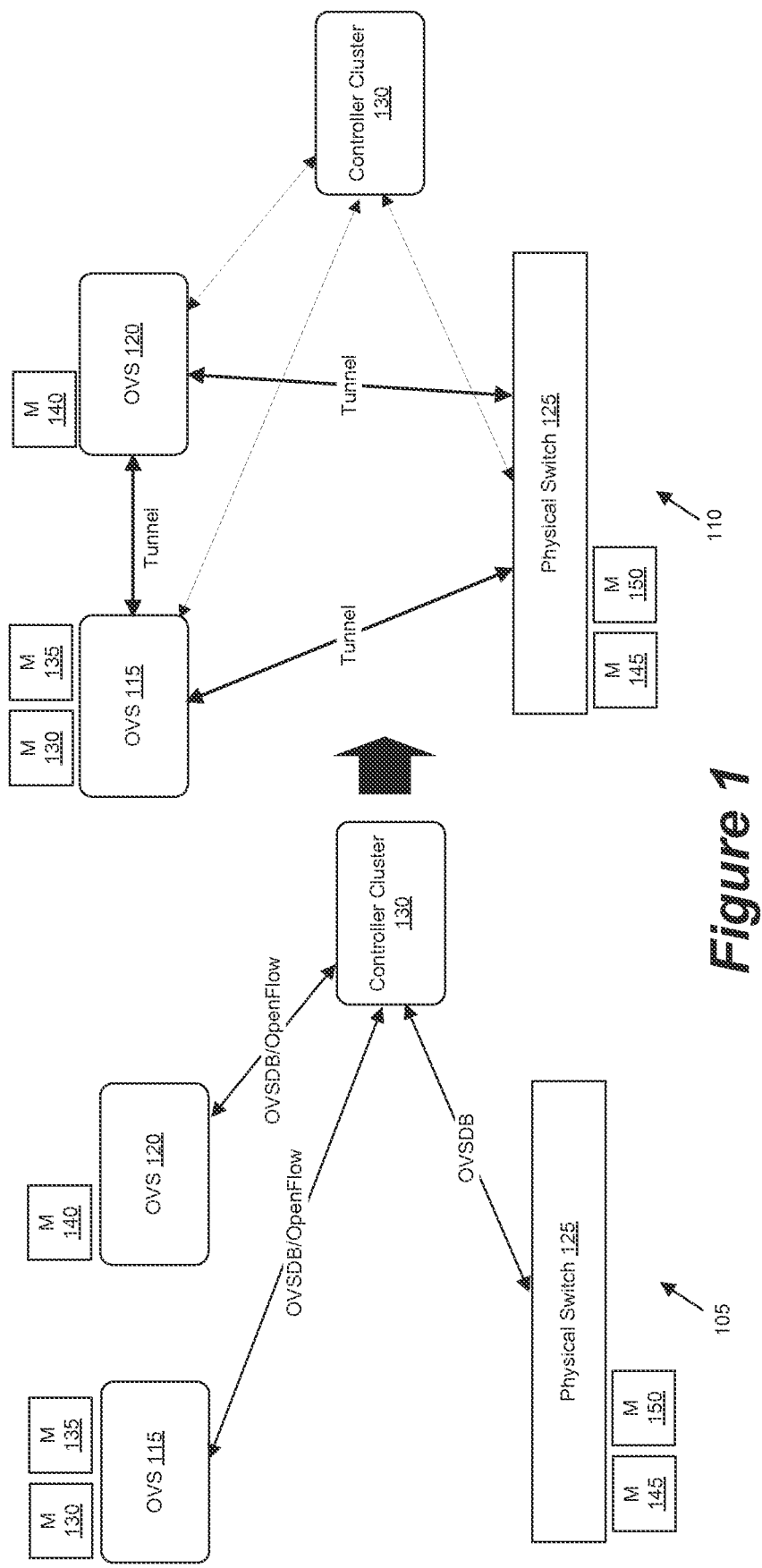
FIG. 1 illustrates an example of how a network controller cluster manages software and hardware switches to create virtual networks.

For some embodiments of the invention, FIG. 1 illustrates an example of how a network controller cluster 130 communicates with several forwarding elements 115-125 to create virtual networks. Specifically, this figure shows the controller cluster exchanging management and configuration data with the forwarding elements to create tunnels. The tunnels extend the virtual network overlay among software or virtual switches 115 and 120 and the physical switch 125. Two operational stages 105 and 110 are shown in this figure.

In some embodiments, the forwarding elements 115-125 can be configured to route network data (e.g., packets) between network elements 130-150 (e.g., virtual machines, computers) that are coupled to the forwarding elements. For instance, the software switch 115 can route data to the software switch 120, and can route data to the physical switch 125. In addition, the software switch 120 can route data to the software switch 115 and the physical switch 125, while the physical switch can route data to the two software switches.

The software switch (115 or 120) operates on a host (e.g., a hypervisor). As an example, the software switch 115 may operate on a dedicated computer, or on a computer that performs other non-switching operations. The physical switch 115 has dedicated hardware to forward packets. That is, different from the software switches 115 and 120, the physical switch 115 has application-specific integrated circuits (ASICs) that are specifically designed to support in-hardware forwarding. The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

The network controller cluster 130 manages and configures the forwarding elements 120 to create virtual networks. In some embodiments, the network controller cluster 130 communicates with the software switches 115 and 120 using different protocols. Specifically, the protocols include an OpenFlow protocol and a database protocol. The OpenFlow protocol is primary used to inspect and modify a set of one or more flow tables (analogous to a set of flow tables in the physical switch 125). The network controller cluster computes flows and pushes them to the software switches 115 and 120 through the OpenFlow channel. The network controller cluster 130 communicates with the software switches 115 and 120 using the database protocol to create and manage overlay tunnels to transport nodes. The network controller cluster 130 might also use this protocol for discovery purposes (e.g., discover which virtual machines are hosted at a hypervisor).

For the software switches 115 and 120, the network controller cluster 130 uses these two protocols to implement packet forwarding for logical datapaths. Each logical datapath comprises a series (pipeline) of logical flow tables, each with its own globally unique identifier. The tables include a set of flow entries that specify expressions to match against the header of a packet, and actions to take on the packet when a given expression is satisfied. Possible actions include modifying a packet, dropping a packet, sending it to a given egress port on the logical datapath, and writing in-memory metadata (analogous to registers on the physical switch 125) associated with the packet and resubmitting it back to the datapath for further processing. A flow expression can match against this metadata, in addition to the packet's header. The network controller cluster 130 writes the flow entries for each logical datapath to a single software switch flow table at each software switch that participates in the logical datapath.

Different from the software switches 115 and 120, the network controller cluster 130 communicates primarily with the physical switch 125 using with one protocol, namely the database protocol. Through the database channel, the network controller cluster 130 reads the configurations of the physical switch (e.g., an inventory of its physical ports) and sends management data to the physical switch. For example, a network controller might send instructions to the physical switch 125 to create tunnel ports for a logical switch.

In some embodiments, the network controller cluster 130 communicates with the physical switch over the database channel to exchanges forwarding state (e.g., L2 and/or L3 forwarding state). For instance, the physical switch 125 might send an update notification to a network controller regarding a learned MAC address of a machine (e.g., desktop computer, laptop) that is connected to its port. The network controller can then compute a flow and push the flow down to the software switches using the OpenFlow channel. The network controller might also send to the physical switch 125 the MAC addresses of the machines 130-140 that are coupled to the software switches 115 and 120.

The forwarding state is exchanged with the physical switch 125 because the flows of the physical switch is ASIC based and not OpenFlow based as in the software switches 115 and 120. In other words, the network controller cluster 130 do not compute flows for the physical switch 125 and push the flows to the physical switch through the database channel. The physical switch 125 computes its own flows based on the forwarding information, and how the physical switch computes the flows can vary from one switch vendor to another.

Having described several components of FIG. 1, an example operation of these components will now be described by reference to the two stages 105 and 110 that are shown in the figure. The first stage 105 illustrates an example control plane implementation to create tunnels between the forwarding elements 115-125. In particular, the network controller cluster 130 exchanges management data with the software switches 115 and 120 using the database protocol. The network controller cluster 130 also computes and pushes flows to the software switches 115 and 120 through the OpenFlow channel. The network controller cluster 130 communicates with the physical switch to send management data using the database protocol. The dedicated hardware then translates the management data to define a tunnel between the hardware and each of the software switches (115 and 120). Furthermore, the network controller cluster 130 and the physical switch 125 use the database protocol to exchange forwarding state.

The second stage 110 shows an example data plane view of the virtual network. In this example, several tunnels are established between each two forwarding elements. Namely, a tunnel is established between the two software switches 115 and 120. There is also a tunnel between the physical switch 125 and the software switch 115, and between the physical switch 125 and the software switch 115. In some embodiments, these tunnels provide a virtual unicast or multicast link (e.g., Ethernet link) between the forwarding elements 115-125, which forward unencapsulated frames to and from attached components such as the machines 130-150 (e.g., VMs or physical links).

In the example described above, the network controller cluster 130 defines the physical switch 125 to be a tunnel endpoint. Normally, an extender or a gateway is used to connect two managed environments, or a managed environment and an unmanaged environment. The extender is an x86 box (e.g., that runs the software switch). As the physical switch 125 is managed by network controller cluster 130, the system does not introduce such an extender in between the physical switch 125 and the machines 145 and 150. Thus, there is no one extra hop that can hinder performance and latency, and with possible hardware specifications that provide less throughput than with the physical switch's dedicated hardware.

Many more examples of managing hardware and software forwarding elements are described below. Specially, Section I show several an example database protocol that is used to extend the control to hardware switches and appliances. This is followed by Section II that describes several example features of a database server that is installed on hardware. Next, Section III describes examples of creating virtual networks with hardware and software switches. Section IV then describes examples of exchanging forwarding state with a physical switch. Section V then describes several examples packet flows, including known unicast, unknown unicast, and multicast. Section VI section then describe the environment in which some embodiments of the inventions are implemented. Finally, Section VII describes an example of an electronic system that implement some embodiments described herein.

I. Extending the Management Beyond Software Switches and Appliances

In some embodiments, the network controller cluster defines each virtual network through software switches and/or software appliances. To extend the control beyond software network elements, some embodiments implement a database server on dedicated hardware. The set of network controllers accesses the database server to send management data. The dedicated hardware then translates the management data to connect to a managed virtual network.

Figure 2:
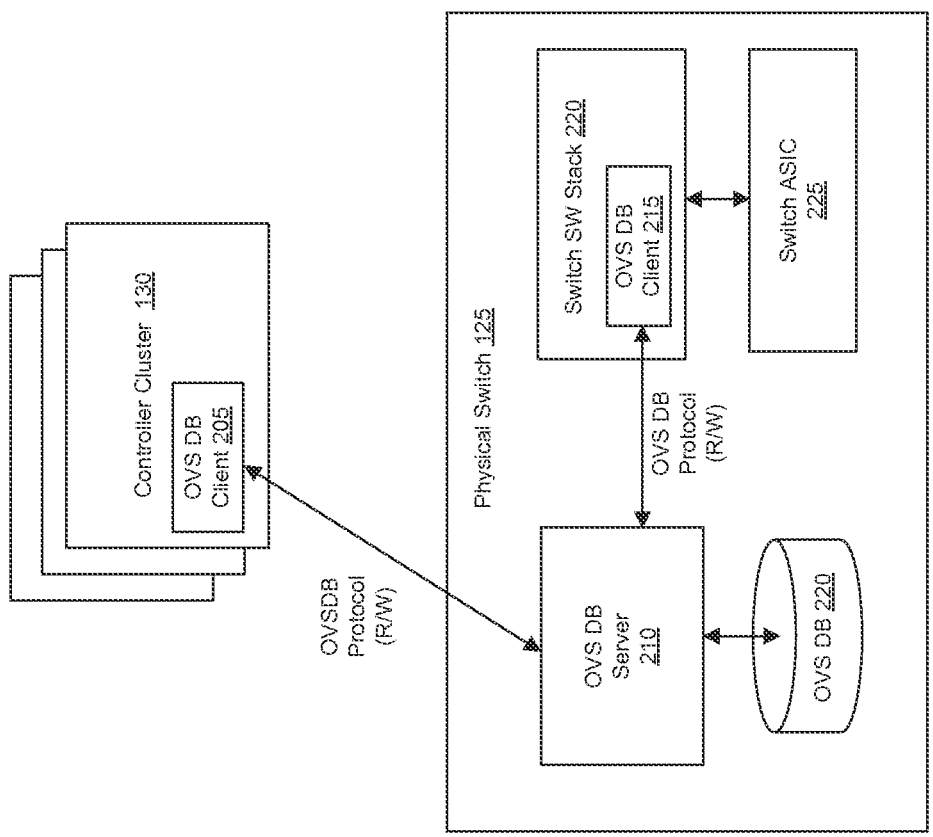
FIG. 2 provides an illustrative example of a network controller cluster that communicates with a hardware switch.

FIG. 2 provides an illustrative example of a network controller cluster that communicates with a hardware switch. The network controller cluster exchanges data with such hardware to connect the hardware to the virtual networks. This figure shows the network controller cluster 130 and the physical switch 125. The physical switch 125 includes a database server 210, a software stack 220, and a switch ASIC 225. The software stack has a database client 215. Similarly, each network controller has a database client 205.

In some embodiments, the database server 210 is designed to handle transactions and deal with conflicts in having multiple writers (e.g., the more than one network controllers writing to a database). The database server 210 is also designed to provide asynchronous notifications. For example, when there is an update to a database table, the database server 210 sends a notification regarding an update to a client (e.g., executing on a network controller or on the hardware). The notification may include a copy of the table or a subset of the table (e.g., a record) that was updated. In the example of FIG. 2, the database server 210 is an Open Virtual Switch (OVS) database server that accesses the OVS database 220.

The switch software stack 220 represents several programs that operate on the physical switch 125. The software stack can include a variety of different programs to configure and manage the switch. This can include management that is in and outside of the scope of the network controller cluster 130. For instance, the software stack may include a program to update its firmware, modify switch settings (e.g., its administrative password), and/or reset the switch. The software stack 220 is vendor specific, which means that it can change from one vendor to another vendor. In addition, different vendors might provide different features that are represented by their corresponding software stack 220.

In FIG. 2, the software stack 120 includes at least one module to program the switch ASIC. The switch ASIC is a component, which is specifically designed to support in-hardware forwarding. That is, it is primarily designed to quickly forward packets. To simplify the description, only one switching ASIC is shown. However, one of ordinary skill in the art would understand that the physical switch could include a number of ASICs that operate in conjunctions with one another to forward packets.

As shown, the database server 210 communicates with multiple clients 205 and 215. Each client accesses the database 220 through the database server 210. Each client reads and writes to the database 220 using the database protocol. Each client may also be notified of an update to the database 220 (e.g., a table, a subset of a table). In some embodiments, the database protocol specifies a monitor call, which is a request, sent from a database client (205 or 215) to the database server 210, to monitor one or more columns of a table and receive updates when there is an update to the one or more columns (e.g., a new row value, an update to an existing row value, etc.). For instance, the network controller's client 205 may be notified when the switch's client 215 updates the database 220, and vice versa.

In some embodiments, the database server 210 is used to write forwarding state to the database 220. The physical switch 125 is in a sense publishing its own forwarding tables in the database 220. As an example, the database client 215 on the switch software stack may update the database 220 with MAC addresses of a machine that is connected to its port. This would in turn cause the database server 210 to send a notification regarding the update to the client 205 on a network controller.

Figure 3:
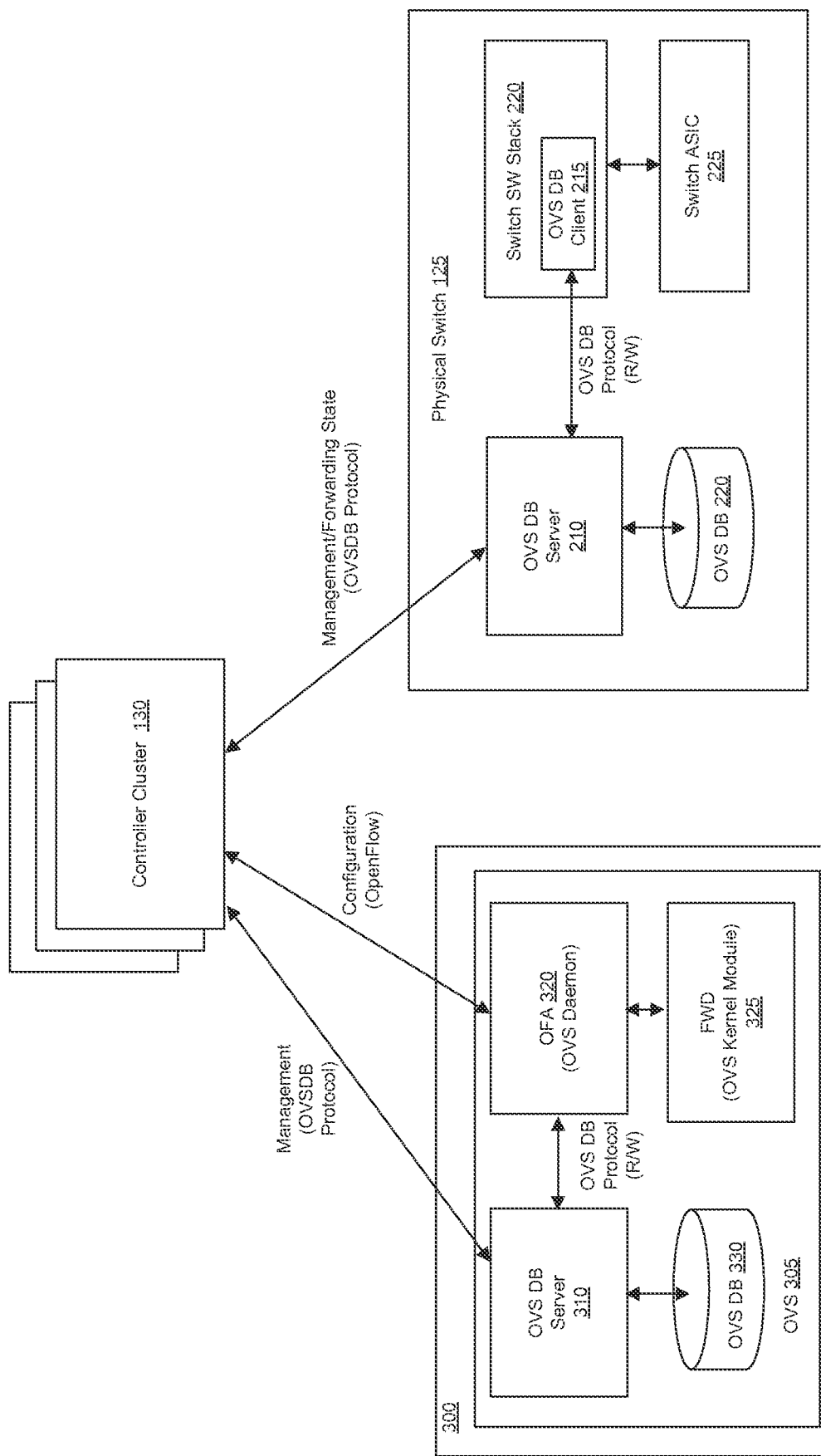
FIG. 3 is a system diagram that illustrates the network controller cluster 130 communicating with both hardware and software switches.

Similar to the physical switch 125, the network controller cluster 205 is publishing addresses of other machines (e.g., virtual machines) that are connected to one or more software switches (not shown). When the client 204 on the network controller end makes an update to database 220, the update would in turn generate a notification for the client 215 on the switch software stack 220. The client 220 may then read the update, and a software on the stack may program a Content Addressable Memory (CAM) or Ternary CAM (TCAM) in the switch ASIC In the example described above, the network controller communicates with a dedicated hardware, namely a hardware switch. FIG. 3 is a system diagram that illustrates the network controller cluster 130 communicating with both hardware and software switches. Specifically, this figure shows how the network controller cluster 130 exchanges management and configuration data (e.g., flows) with a software switch using the database protocol and the OpenFlow protocol, while exchange management data and forwarding state with the physical switch 125 using the database protocol. In this example, the software switch 405 operates on a host 400. The software switch 405 has a database server 410, an OpenFlow agent 415, and a forwarding module 420. The software switch 405 of some embodiments is an Open Virtual Switch (OVS). In those embodiments, the flow agent 415 may be referred to as an OVS daemon, and the forwarding module 410 may be referred to as a kernel module.

In some embodiments, the host 400 includes hardware, hypervisor, and one or more virtual machines (VMs). The hardware may include typical computer hardware, such as processing units, volatile memory (e.g., random access memory (RAM)), nonvolatile memory (e.g., hard disc drives, optical discs, etc.), network adapters, video adapters, or any other type of computer hardware. The hardware can also include one or more NICs, which are typical network interface controllers.

A hypervisor is a software abstraction layer that can run on top of the hardware of the host 400. There are different types of hypervisors, namely Type 1 (bare metal), which runs directly on the hardware of the host, and Type 2 (hosted), which run on top of the host's operating system. The hypervisor handles various management tasks, such as memory management, processor scheduling, or any other operations for controlling the execution of the VMs. Moreover, the hypervisor communicates with the VMs to achieve various operations (e.g., setting priorities). In some embodiments, the hypervisor is a Xen hypervisor while, in other embodiments, the hypervisor may be any other type of hypervisor for providing hardware virtualization of the hardware on the host 400.

In some embodiments, the software switch 305 runs on a VM. The VM can be a unique virtual machine, which includes a modified Linux kernel (e.g., to include the OVS kernel module 325). The VM of such embodiments is responsible for managing and controlling other VMs running on the hypervisor. In some embodiments, the VM includes a user space and the OVS daemon runs as a background process in the user space.

The OVS daemon 320 is a component of the software switch 305 that makes switching decisions. On the other hand, the kernel module 325 receives the switching decisions, caches them, and uses them to process packets. For instance, when a packet comes in, the kernel module 325 first checks a datapath cache (not show) to find a matching flow entry. If no matching entry is found, the control is shifted to the OVS daemon 320. The OVS daemon 320 examines one or more flow tables to generate a flow to push down to the kernel module 325. In this manner, when any subsequent packet is received, the kernel module 325 can quickly process the packet using the cached flow entry. The kernel module 325 provides a fast path to process each packet. However, the switching decisions are ultimately made through the OVS daemon 320, in some embodiments.

A network controller uses the OpenFlow protocol to inspect and modify a set of one or more flow tables managed by the OVS daemon 320. The network controller cluster computes flows and pushes them to the software switch 305 through this OpenFlow channel. The network controller communicates with the software switch using the database protocol to create and manage overlay tunnels to transport nodes. The network controller might also use this protocol for discovery purposes (e.g., discover which virtual machines are hosted at the hypervisor). The OVS daemon 320 also communicates with the database server 310 to access management data (e.g., bridge information, virtual interfaces information) stored in the database 330.

Different from the software switch, a network controller communicates with the physical switch 125 using the database protocol. The database protocol is essentially used to control the physical switch 125. Through the database channel, the network controller reads the configurations of the physical switch (e.g., an inventory of its physical ports) and sends management data to the physical switch. For example, a network controller might send instructions to the physical switch to create tunnel ports for a logical switch. As mentioned above, the network controller cluster 130 exchanges forwarding state (e.g., L2 and/or L3 forwarding state) with the physical switch 125. That is, the network controller instructs the physical switch 125 to program its forwarding table using the database protocol.

Figure 4:
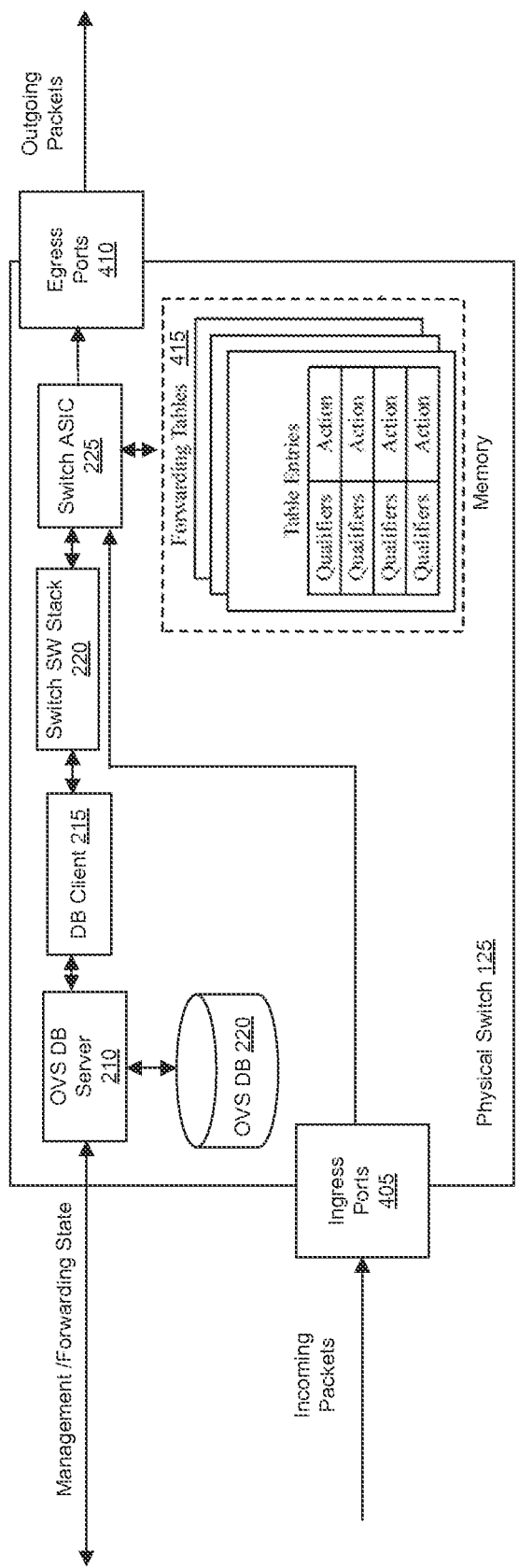
FIG. 4 conceptually illustrates an architectural diagram of an example hardware switch.

FIG. 4 conceptually illustrates an architectural diagram of an example hardware switch (e.g., a third-party switch). As illustrated in this figure, the switch 125 includes ingress ports 405, egress ports 410, and forwarding tables 415. The switch also includes the database server 210, the database client 215, the SW Stack 220, and the switch ASIC 225, which are describe above by reference to FIG. 2.

The ingress ports 405 conceptually represent a set of ports through which the switch 405 receives network data. The ingress ports 405 may include different amounts of ingress ports in different embodiments. As shown, the ingress ports 405 can receive network data that is external to the switch 125, which is indicated as incoming packets in this example. When a packet is received through an ingress port, the switch 125 may send the packet to the switch ASIC 225 so that the packet can be quickly processed.

The egress ports 410 conceptually represent a set of ports through which the switching 405 sends network data. The egress ports 410 may include different amounts of egress ports in different embodiments. In some embodiments, some or all of the egress ports 410 may overlap with some or all of the ingress ports 410. For instance, in some such embodiments, the set of ports of the egress ports 410 is the same set of ports as the set of ports of ingress ports 910. As illustrated in FIG. 4, the egress ports 410 receive network data after the switching 125 processes the network data based on the forwarding tables 415. When the egress ports 405 receive network data (e.g., packets), the switch 125 sends the network data out of the egress ports 410, which is indicated as outgoing packets in this example, based on an entry in the forwarding tables 415.

In some embodiments, the forwarding tables 415 store active flow tables and/or flow entries that are used to determine operations for making switching decisions. In this example, each flow entry is includes a qualifier and an action. The qualifier defines a set of fields to match against a set of packet header fields. As shown in FIG. 4, the flow entries are stored in memory. The memory can be random access memory (RAM) or some other type of memory such as Content Addressable Memory (CAM) or Ternary Content Addressable Memory (TCAM). For example, a vendor may design their Layer 2 switches with CAM for performing Layer 2 switching and/or with TCAM for performing Quality of Service (QoS) functions. The switch architecture may support the ability to perform multiple lookups into multiple distinct CAM and/or TCAM regions in parallel. The CAM and TCAM are examples of switching ASICs that some vendors' switches leverage for line-speed fast switching.

As described above, an instance of the database server 220 controls access to the database 220. The database client 215 accesses the database 220 to read and write management data and forwarding state. In addition, a database client on the network controller accesses the database 220 to read and write management data and forwarding state. The database server may 210 send a notification to one database client (e.g., on the switch end) if the other database client (e.g., on the network controlled end) updates a table or a subset of a table of the database 220.

One other distinction to note is that the hardware switch's model is more generalized than that of the software switch's model. In the software switch, the network controller has specific knowledge of how forwarding works, and takes advantage of it. On the other hand, the operations of the hardware switch can vary from one third-party vendor to another. Therefore, in the hardware model, database is more abstract in that it contains the basic information to manage the hardware and exchange forwarding state.

II. Example Database Operations

Some embodiments implement a database server on dedicated hardware. In some embodiments, the network controller cluster uses a database protocol to accesses this database server. Several example of such database server will now be described in this section by reference to FIGS. 5-9. This section also describes various protocol messages used to communicate with the database server. In some embodiments, the database is an Open Virtual Switch (OVS) database and the protocol is an OVS database protocol.

A. Locking Operations

To prevent multiple clients writing to the database at the same time, the database protocol may support various lock operations to lock or unlock the database. One of reasons for using such feature is that they resolve conflicts between multiple writers. For example, two different controllers may assume to be masters, and attempt to write to a database at the same time. This locking feature resolves that conflicts by making each network controller receive permission before writing to the database. In some embodiments, each client must obtain a particular lock from the database server before the client can write to a certain table of the database. The database will assign the client ownership of the lock as soon as it becomes available. When multiple clients request the same lock, they will receive it in first-come, first served order. After receiving the lock, the client can then write to the database and release the lock by perform an unlock operation.

Figure 5:
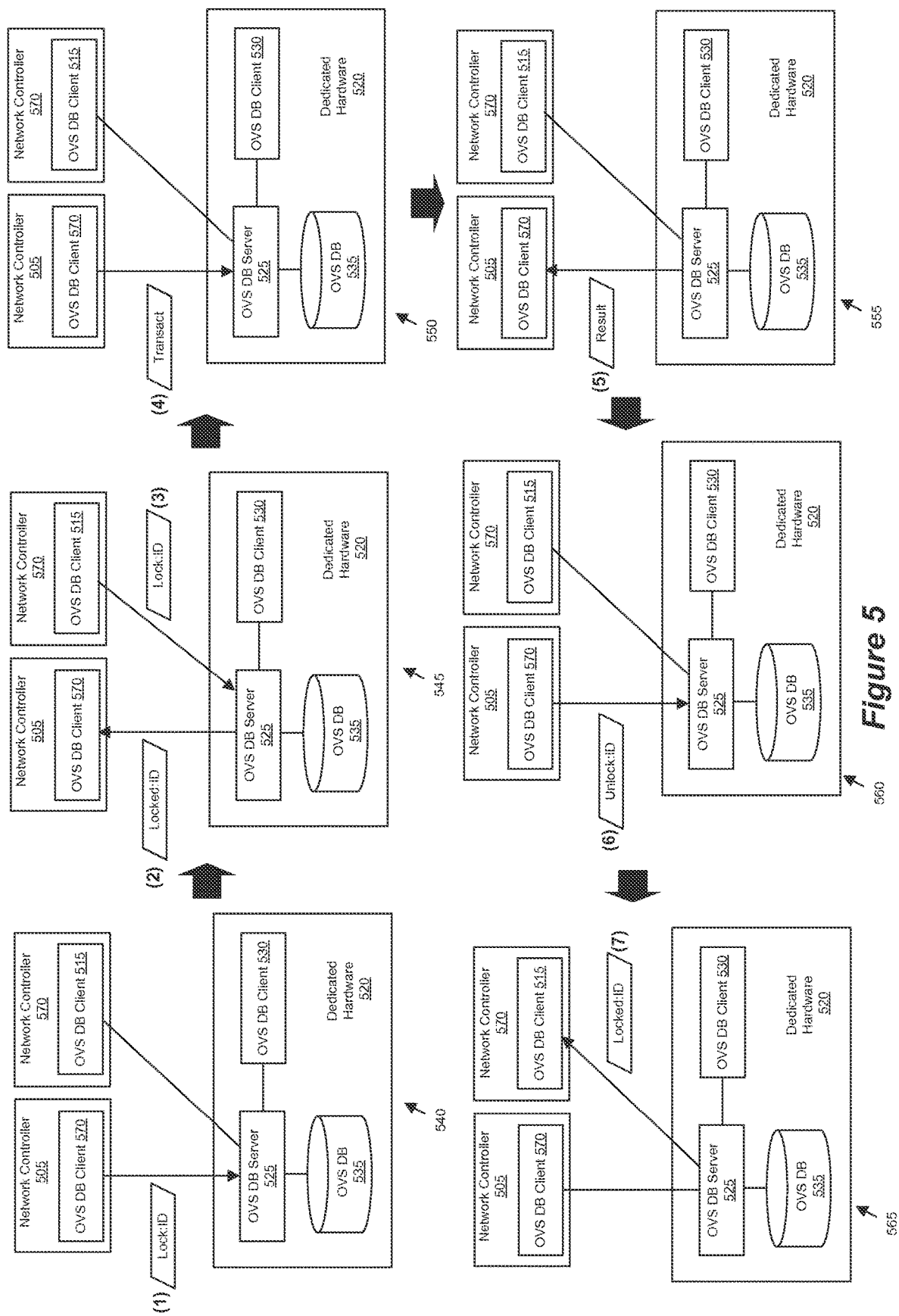
FIG. 5 provides an illustrative example of how a database server handles conflicts in having multiple network controllers attempting to update a database at the same time.

FIG. 5 provides an illustrative example of how a database server 525, which executes on a dedicated hardware 520, handles conflicts in having multiple network controllers 505 and 510 attempting to update a database 535 at the same time. Six operational stages 540-565 are shown in this figure. The dedicated hardware 520 includes the database server 525 and the database client 530. The database server 525 controls access to the hardware's database 535. The dedicated hardware 520 can be any device, ranging from switches to appliances such as firewalls, load balancers, etc.

To simplify the description, only two network controllers 505 and 510 are shown in this figure. However, there can be additional network controllers. Each network controller has a database client (515 or 570) that can communicate with the database server 525 to access the database 535. In some embodiments, each client (515 or 570) communicates with the database server 525 through the database communication protocol (e.g., a JavaScript Object Notation (JSON) remote procedure call (RPC)-based protocol).

The first stage 540 shows the client 570 on the network controller 505 making a first call (e.g., RPC) to the database server 525. The first call is a lock operation call. In some embodiments, the database server 525 will assign the client 570 ownership of the lock as soon as it becomes available. When multiple clients request the same lock, they will receive it in first-come, first served basis. The database server 525 of some embodiments supports an arbitrary number of locks, each of which is identified by an (e.g., a client-defined ID). In some embodiments, the precise usage of a lock is determined by the client (515 or 570). For example, the clients 515 and 530 may be programmed to agree that a certain table can only be written by the owner of a certain lock. That is, the database server 525 itself does not enforce any restrictions on how locks are used. The database server 525 simply ensures that a lock has at most one owner.

The second stage 545 assumes that the specified lock is available. Accordingly, the database server 525 sends a response. The response is "locked" notification, which notifies the client 570 that it has been granted a lock it had previously requested with the "lock" method call. In some embodiments, the notification has the client-defined ID.

At the same second stage 545, the client 515 on the network controller 510 makes a call (e.g., RPC) to the database server 525 requesting the same lock (e.g., to modify a same table). However, the lock has already been assigned to the client 570 on the network controller 505. In some embodiments, the client 570 has to perform an unlock operation by sending an unlock request to the database server 525 with the lock ID. When the lock is released, the database server will then send the locked notification to the next client (e.g., the client 515 or 530) that is in line to use the lock. In some embodiments, the database protocol supports a call to steal a specified lock.

In the third stage 520, the ownership of the specified lock belongs to the client 570 on the network controller 505. The client 515 on the network controller 510 cannot access one or more tables of the database 535. The enforcement of this security policy, in some embodiments, is defined at the client 515. In other words, the database server 525 is not programmed to stop the client 515 from the accessing one or more of the same tables, but the client 515 is programmed to stop itself. One of ordinary skill in the art would understand that the database server could be programmed to enforce its own security policies. For instance, the database server 525 can be implemented such that it locks a database table that is being accessed by a client.

The third stage 550 illustrates the client 570 on the network controller 570 exercising the ownership of the lock by sending to the database server 525 a transaction call (e.g., in order to insert or update a record in the database 535). The fourth stage 555 illustrates the database server 525 performing the transaction on the database 535 and returning a result of the transaction. The fifth stage 560 shows the client 570 on the network controller 505 releasing the specified lock. In some embodiments, the database server 525 sends a confirmation message (not shown) of releasing the lock to the database client 570 on the network controller 505. As the lock is released, the sixth stage 565 shows the ownership of the lock being transferred to the client 515 on the network controller 510.

In the example described above, two clients 570 and 515 on the network controllers 505 and 510 attempt to perform transactions on the same database table at the same time. In some embodiments, the client 530 on the dedicated hardware 520 must take ownership of the lock to write to a database table. That is, when the client (570 or 515) on the network controller (505 or 510) has ownership of the lock, the client 530 on the hardware 520 must wait until the lock becomes available.

B. Bi-Directional Asynchronous Notifications

In some embodiments, the database server supports bi-directional asynchronous notifications. For example, when there is an update to a database table, the database server sends a notification regarding an update to a client (e.g., executing on a network controller or on the hardware). The notification may include a copy of the table or a subset of the updated table (e.g., a record). The bi-directional asynchronous notification mechanism is different from polling the database server to determine if there are any changes to one or more tables. The asynchronous notification feature is particularly useful because each client executing on a network controller or on the hardware receives a message when a set of one or more columns of interest has changed.

The database protocol of some embodiments provides a mechanism to receive notifications (e.g., asynchronous notification). In some embodiments, each client can use the database protocol's monitor or registration request to monitor a database. This request enables the client to replicate tables or subsets of tables within the database by requesting notifications of changes to those tables and by receiving the complete initial state of a table or a subset of a table. With this database call, the client can specify one or more table columns to monitor. The columns can be from any number of database tables. The client can also use the monitor cannel request to cancel a previously issued monitor request.

The client of some embodiments can specify different types of operations to monitor, such as initial, insert, delete, and modify. The initial parameter specifies that each and every row in the initial table be sent as part of the response to the monitor request. The insert parameter specifies that update notifications be sent for rows newly inserted into the table. The delete parameter specifies that update notifications be sent for rows deleted from the table. The modify parameter specifies that update notifications are sent whenever a row in the table is modified. When there is a change to any one of the monitored fields, the database server of some embodiments returns a table update object. This object may include previous row values if the rows values have been modified or deleted.

Figure 6:
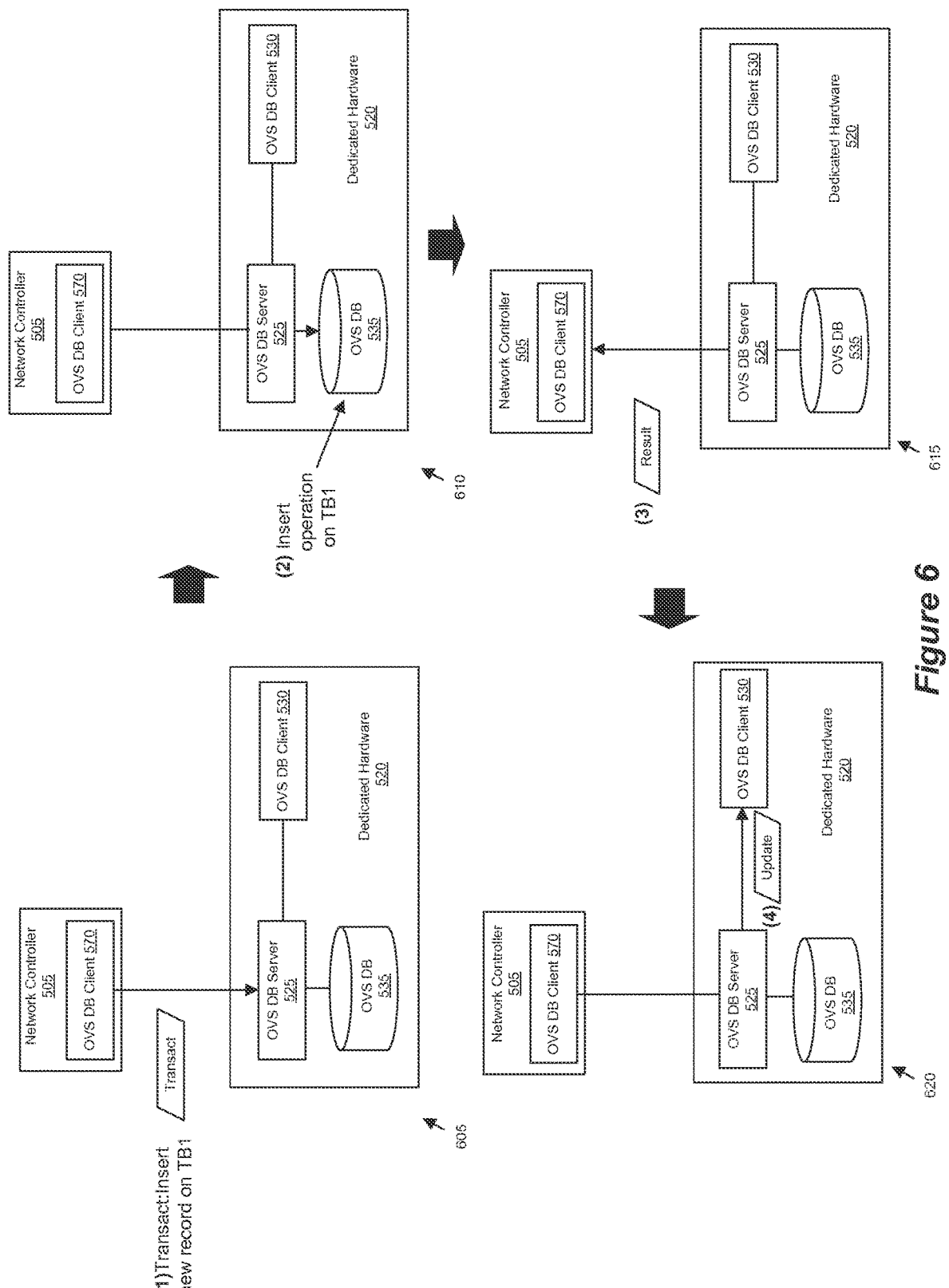
FIG. 6 illustrates an example of a client on dedicated hardware being notified of an update to a database table.

FIG. 6 illustrates an example of the client 530 on the dedicated hardware 520 being notified of an update to a database table. Four operational stages 605-620 are shown in this figure. The figure shows the network controller 515 communicating with the hardware 520. The network controller 505 includes the database client 570, and the hardware 520 includes the database client 530 and the database server 525.

The first stage 605 illustrates the client 570 on the network controller 505 sending a transaction request to the database server 525 on the hardware 520. The transaction call includes a request to insert a new record on a particular table. The client 530 on the hardware 520 has previously sent the database server 525 a request to monitor this table.

The second stage 610 shows the database server 525 on the hardware 520 performing the requested operation on the database 535. In particular, the database server 525 inserts a new record in the particular table. The third stage 615 shows the database server 525 sending the result of the transaction to the client 570 on the network controller 505. After performing the insert operation, the database server 525 sends (at stage 620) the update notification to the client 530 on the hardware 520.

One of the main uses of the contents of the hardware's database is to exchange forwarding tables (e.g., L2 forwarding tables) between the network controller cluster and the hardware switch. The physical switch is publishing its own forwarding tables in the database. One of way this can happens is the database client on the physical switch would make updates to the database contents. This would in turn generate a notification to a client on a network controller.

In some embodiments, the protocol's update call is used to exchange forwarding state. For instance, when the network controller 570 is notified of an update to a software switch, the network controller's client accesses the database server 525 executing on the hardware 520 to write (e.g., a MAC address of a VM) to a database table. This will in turn cause the database server 525 to push the update to the database client 530 executing on the hardware 520. The hardware switch's software stack can then translate the update to a flow that it understands to process packets. Example of pushing such addresses to the hardware 520 will be described below by reference to FIG. 15. The update call can also be used for management purposes, such as setting up tunnel ports for the hardware 520. Example of pushing management data to the hardware 520 will be described below by reference to FIG. 13.

Figure 7:
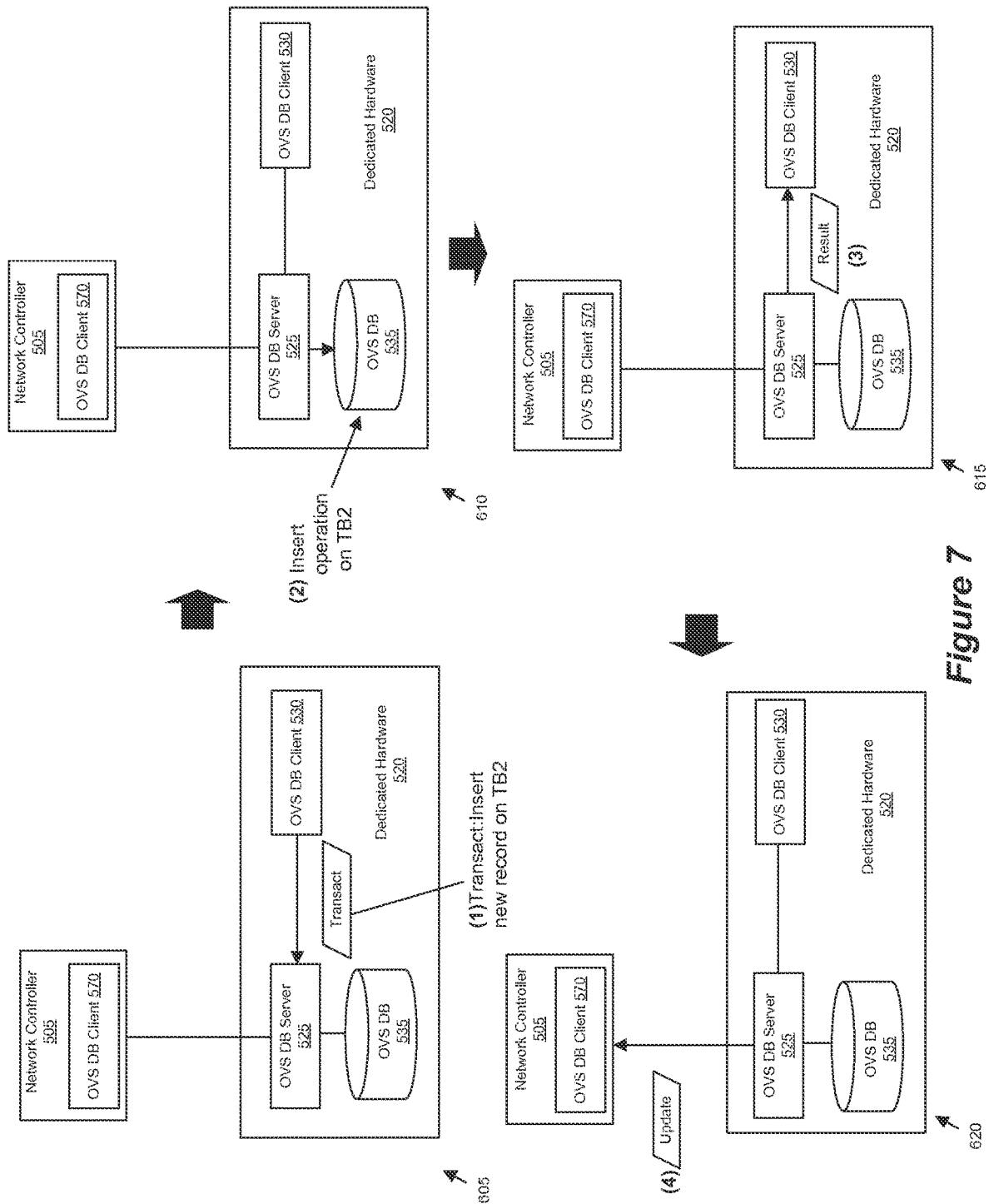
FIG. 7 illustrates an example of a client on a network controller being notified of an update to a database table.

FIG. 7 illustrates an example of the client 570 on the network controller 505 being notified of an update to a database table. This figure is similar to the previous figure. However, in this example, the client 530 on the hardware 520 is inserting a new record in the database 535, and the client 570 on the network controller 505 is being notified of the update.

Four operational stages 705-720 are shown in this figure. The first stage 705 illustrates the client 730 on the hardware 520 sending a transaction request 525 to the database server 525. The transaction call includes a request to insert a new record on a particular table. The client 570 on the network controller 505 has previously sent the database server 525 a request to monitor this table.

The second stage 710 shows the database server 525 on the hardware 525 performing the requested operation on the database 535. In particular, the database server 525 inserts a new record in the particular table. The third stage 715 shows the database server 525 sending the result of the transaction to the client 530. After performing the insert operation, the database server 525 sends (at stage 720) the update to the client on the hardware 520.

In some embodiments, the protocol's update call is used to exchange forwarding state. For instance, if the hardware 520 is a switch, it can publish its forwarding state by having the database client 530 write (e.g., a learned MAC address) to a database table. This will in turn cause the database server 525 to push the update to the database client 570 executing on the network controller 505. The network controller 505 can then notify other network elements (e.g., the software switches, hardware switches) regarding the update. An example of publishing addresses of machines attached to a switch's ports will be described below by reference to FIG. 14. The update call can also be used for management purposes, such as reading an inventory of physical ports on the hardware 520, setting up tunnel ports, etc.

C. Handling Transactions

In some embodiments, the database server is designed to deal with any errors in completing transactions. As an example, for a given transaction, the database server of some embodiments executes a set of operations on a database. When there are multiple operations, the database server may execute each operation in a specified order, except that if an operation fails, then the remaining operations are not executed. The set of operations is executed as a single atomic, consistent, isolated transaction. The transaction is committed only if each and every operation succeeds. In this manner, the database server provides a means of transacting with a client that maintains the reliability of the database even when there is a failure in completing each operation in the set of operations.

Figure 8:
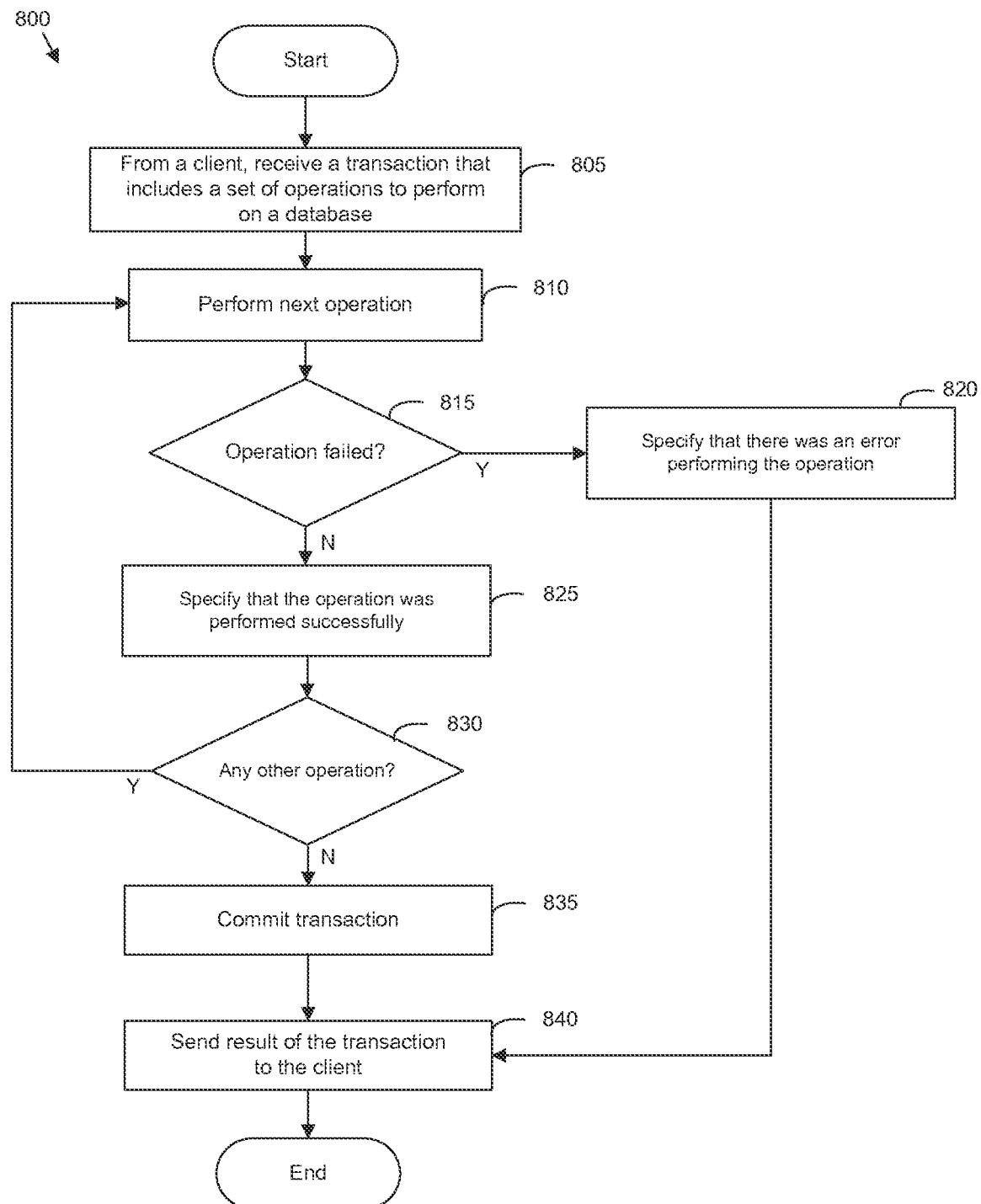
FIG. 8 conceptually illustrates a process that some embodiments perform on a given transaction.

FIG. 8 conceptually illustrates a process 800 that some embodiments perform on a given transaction. The process 800 of some embodiments is performed by a database server that executes on dedicated equipment. As shown, the process 800 begins when it receives (at 805) a transaction that includes a set of operations to perform on a database. The operations can be different types of operations, such as insert, delete, update, etc. In some embodiments, each transaction can include different combinations of different types of operations (e.g., insert and update, delete and insert, etc.).

At D15, the process 800 performs the next operation on the database. The process 800 then determines (at 815) whether the operation on the database has been successfully completed or has failed. When the operation has failed, the process 800 specifies (at 825) that there was an error performing the operation. The process then proceeds to 840, which is described below.

When the operation has not failed, the process 800 specifies (at 825) that the operation has been performed successfully. The process 800 then determines (at 830) whether there is another operation to perform. As stated above, the transaction can include more than one operation to perform on the database. If there is another operation, the process 800 returns to 810, which is described above. If there is no other operation, the process 800 commits (at 835) the transaction. Here, the process 800 is committing the transaction because each and every operation has been successfully performed.

At 840, the process 800 sends the result of the transaction to the client. If the transaction has been committed, the result includes, for each operation, an indication that the operation has been successfully performed or an indication that an operation has failed. These indications are based on what the process 800 specified at operations 820 and 825, which are described above. The indication's value can be simple either a zero or a one Boolean value, which indicates failure or success, respectively, or vice versa.

Some embodiments perform variations on the process 800. The specific operations of the process 800 may not be performed in the exact order shown and described. The specific operations may not be performed in one continuous series of operations, and different specific operations may be performed in different embodiments. Furthermore, the process 800 could be implemented using several sub-processes, or as part of a larger macro process.

D. Garbage Collection

In some embodiments, the database server, which is installed on hardware, is performs a garbage collection operation on a database. Garbage collection is the process of maintaining the database by removing data in a database that is no longer used or outdated. In some embodiments, the garbage collection is performed at runtime (e.g., with each given transaction), performed periodically (e.g., at set interval as a background task), or performed when triggered (e.g., when there is a change to the database or a change to a particular table of the database).

In some embodiments, if a table entry (e.g., a record) is not part of a root set and the entry has no reference or a reference of a particular importance (e.g., a strong reference), then the table entry is subject to garbage collection. The database server of some embodiments allows a table to be defined as a root table. If the table is defined as a root table, the table's entries exist independent of any references. The entries in the root table can be thought off as part of the "root set" in a garbage collector. In referencing other entries, the database server of some embodiments allows each entry to refer to another entry in the same database table or a different database table. To uniquely identify different entries, each entry may be associated with a unique identifier, such as a primary key, Universally Unique Identifier (UUID), etc.

The garbage collection process prevents the database from continually growing in size over time with unused data. For instance, a Top of Rack (TOR) switch may have a database that stores data relating logical switches. The logical switch information can include the addresses (e.g., IP addresses) of the tunnel endpoints that instantiate the logical switch and other supplemental data. In such cases, the garbage collection feature allows those addresses and supplemental data to be deleted from the database when the corresponding logical switch is deleted.

Figure 9:
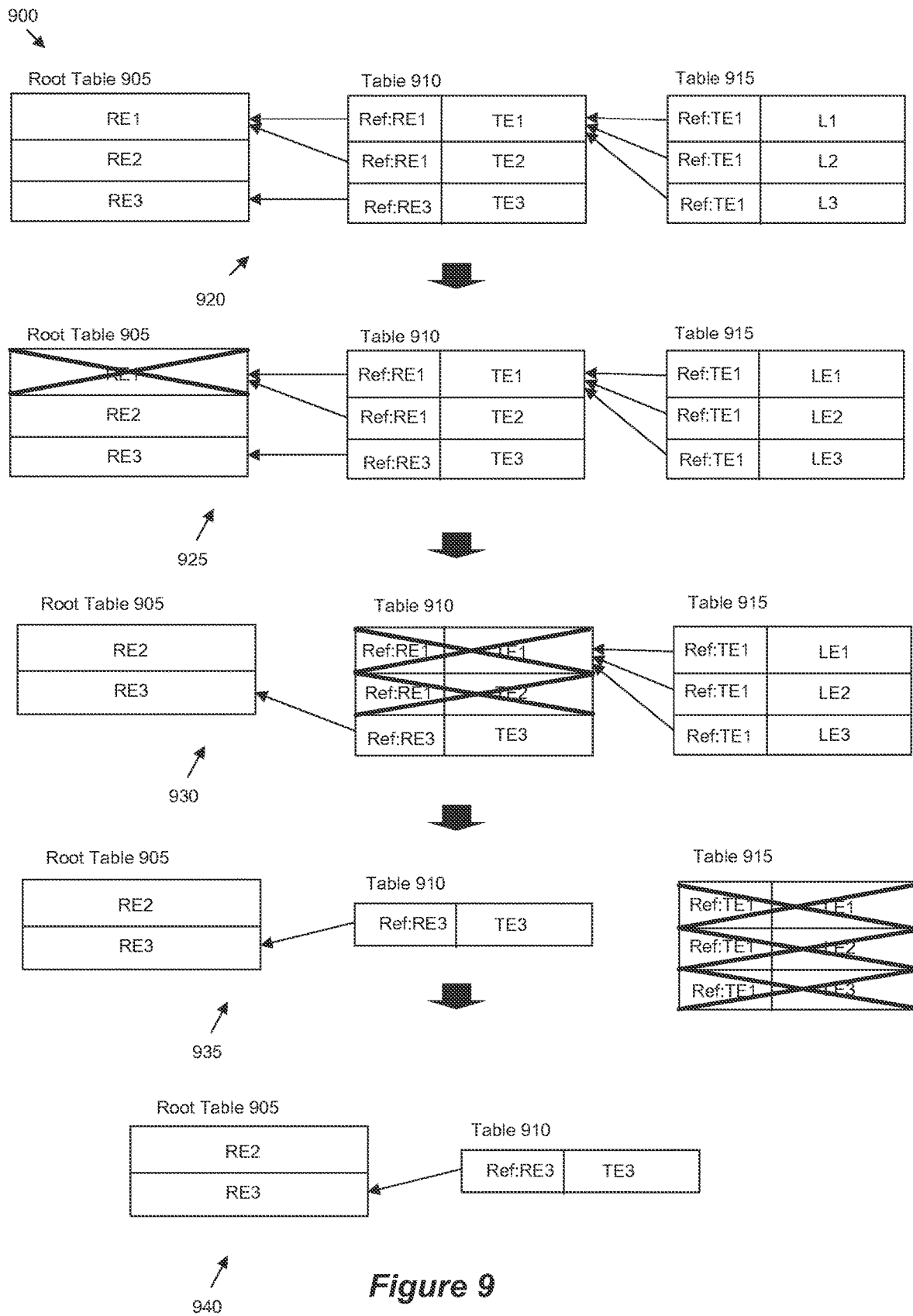
FIG. 9 conceptually illustrates an example of performing a garbage collection operation on a database.

FIG. 9 conceptually illustrates an example of performing a garbage collection operation on a database 900. Specifically, this figure shows several entries being deleted from different tables 910 and 915 when an entry is deleted from a root table 905. Five operational stages 920-940 of the database 900 are shown in this figure.

The first stage 920 shows the database 900 prior to deleting an entry from the root table 905. To simplify the discussion, each of the tables 905-915 shows only three entries. Specifically, the root table 905 has three root entries. The table 910 has three entries with the first two entries referencing the first entry of the root table 905 and the third entry referencing the third entry of the same root table. The table 915 has three entries that all reference the first entry of the table 910. In some embodiments, the table 910 and 910 represents child tables. However, as mentioned above, an entry in a table may reference another entry in the same table. Thus, a child entry can be in a same table as a parent entry.

The second stage 925 illustrates the first entry being deleted from the root table 905. The third stage 930 shows a garbage collection process being performed on the database 900. In particular, the third stage 930 shows that two entries in the table 910 being deleted as a result of the first entry being deleted from the root table 905. In some embodiments, the two entries are deleted from the table 910 because they are not part of a root set and/or each of the entries has no references of a particular value (e.g., a strong reference). This means that the references in the table 915 to the first entry in the table 915 are not reference of a particular importance. If the references were of strong importance, the first entry in the table 910 would not be subject to garbage collection, in some embodiments.

The fourth stage 930 shows the continuation of the garbage collection process. Here, the process deletes all the entries from the table 915. These entries are deleted from the table 915 because they are not part of a root set and are not referenced in a particular manner by any child or leaf entries. The fifth stage 935 shows the result of the garbage collection process. Specifically, it shows that remaining entries after the garbage collection process, which are two entries in the root table 905 and one entry in the table 910.

III. Defining Virtual Networks

The network controller cluster of some embodiments can define a virtual network through software and hardware forwarding elements. That is, the network controller cluster provides interfaces for configuration management and asynchronous notification, which can be used to create a single logical switch across multiple software and hardware forwarding elements. These forwarding elements can be at one location (e.g., at one datacenter) or at multiple different location (e.g., different datacenters). Several examples of such virtual networks will now be described below by reference to FIGS. 10-13.

A. Creating Tunnels

Figure 10:
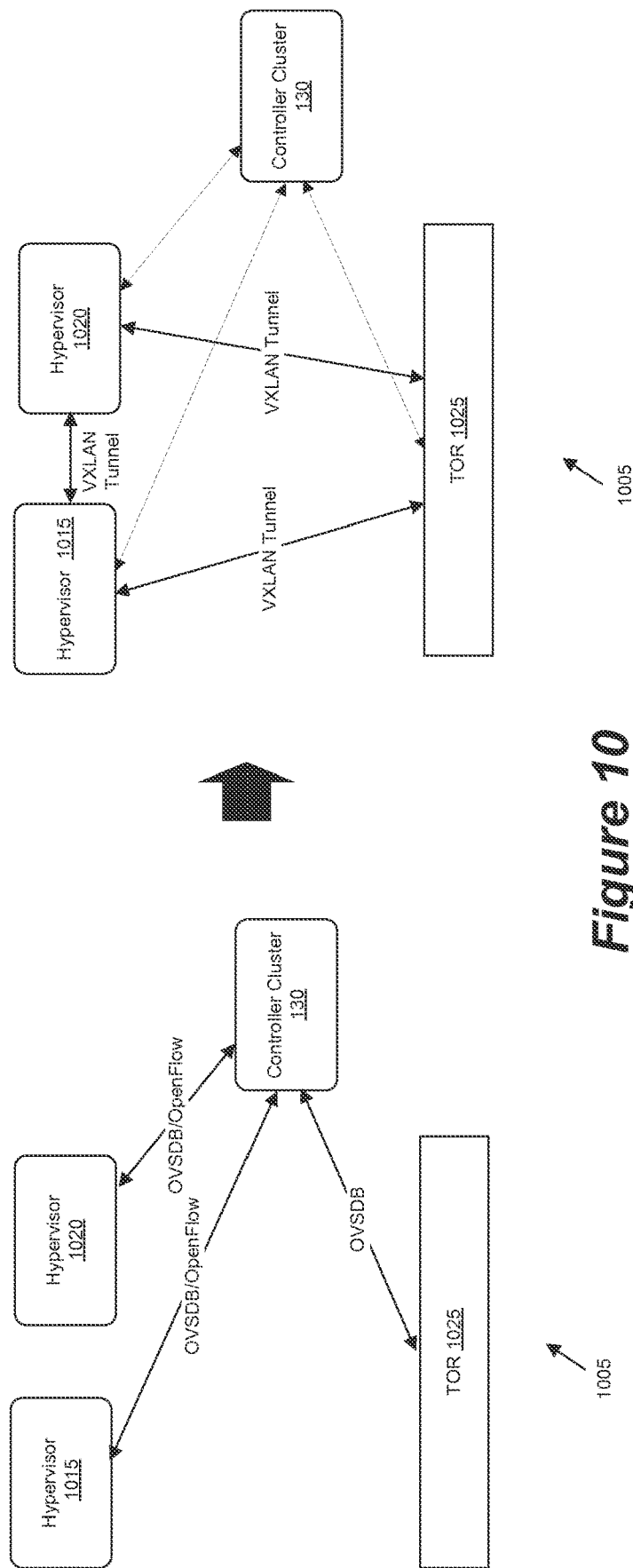
FIG. 10 illustrates an example of a controller cluster that communicates with different edge devices to create tunnels.

FIG. 10 illustrates an example of a controller cluster that communicates with different devices to create tunnels. The devices include a top of rack (TOR) switch 1025, which is a hardware switch, and two network hypervisor 1015 and 1020. Each hypervisor runs an instance of a virtual or software switch, such as Open Virtual Switch (OVS). In this example, the devices may be operating at different locations (e.g., at different datacenters).

Two operational stages 1005 and 1010 are shown in FIG. 10. The first stage 1005 illustrates an example control plane implementation that defines tunnels between the devices 1015, 1020, and 1025. The tunnels extend the virtual network overlay among hypervisors 1015 and 1020 and the TOR switch 1025. In this example, the network controller cluster 130 exchanges management data with the hypervisors 1015 and 1020 using the database protocol. The management data includes instructions on how each device should create a tunnel between itself and another device. For instance, each of tunnel endpoint may receive addresses (IP addresses) of other tunnel endpoints, addresses of service nodes, virtual network identifiers (VNIs) to use for tunnels, etc. In some embodiments, the VNI is also referred to as a logical forwarding element identifier (LFEI). This is because the identifier is used to effectuate the creation of the logical forwarding element from several managed edge forwarding elements. That is, two or more edge managed forwarding elements use the same VNI to create a separate broadcast domain for a set of machines attached their virtual interfaces or ports.

In some embodiments, the network controller cluster 130 computes and pushes flows to the hypervisors 1015 and 1020 through the OpenFlow channel. The network controller cluster 130 exchanges management data with the TOR switch 1025 using the database protocol. The database protocol is also used by the controller cluster 130 and the TOR switch 1025 to exchange forwarding state.

The second stage 1005 shows an example data plane view of the overlay network that is established through the controller cluster 130 and the devices 1015-10255. In particular, the network controller cluster 130 has pushed management data to establish a tunnel between the two hypervisors 1015 and 1020, between the hypervisor 1015 and the TOR switch 1025, and between the hypervisor 1020 and the TOR switch 1025.

The second stage 1005 shows Virtual Extensible LAN (VXLAN) tunnels. However, other types of tunnels can be established depending on the encapsulation protocol that is used. As an example, the network control cluster 1010 can be configured to create different types of tunnels such as Stateless Transport Tunneling (STT) tunnels, Network Virtualization using Generic Routing Encapsulation (NVGRE), etc.

The previous example illustrated tunnels being established between several edge devices. In some embodiments, the tunnels are established to create virtual private networks (VPNs) for different entities (e.g., clients, customers, tenants). The network controller cluster of some embodiments implements multiple logical switches elements across different types of switching elements, including software and hardware switches. This allows multiple different logical forwarding elements to be implemented across any combination of software and/or hardware switches.

B. Logical Forwarding Elements

Figure 12:
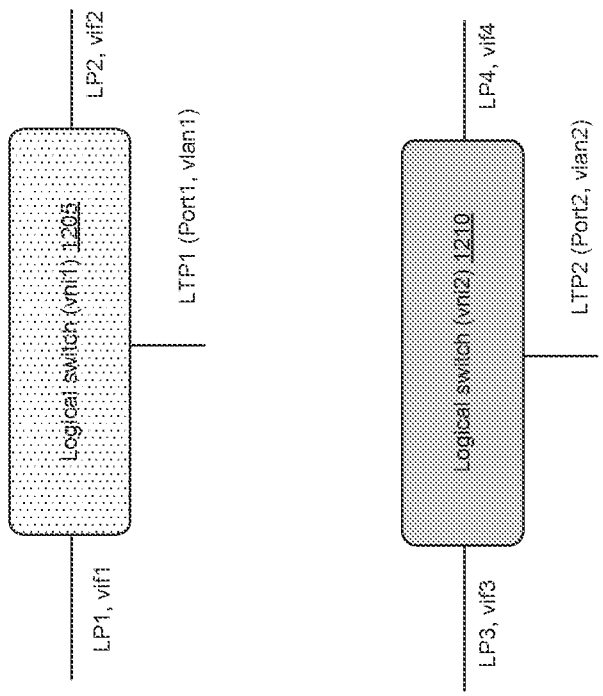
FIG. 12 shows an example logical topology with two logical switches.
Figure 11:
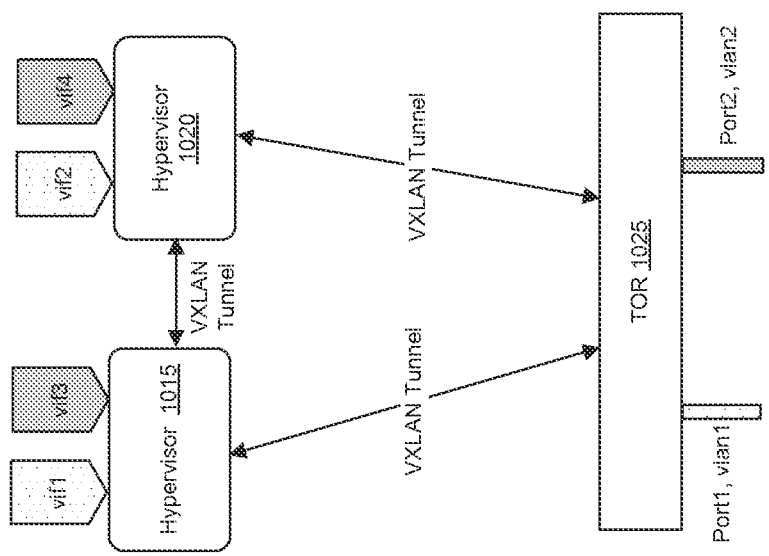
FIG. 11 shows an example physical topology with several tunnel endpoints.

FIGS. 11 and 12 illustrate an example of defining two separate logical switches. Specifically, FIG. 11 shows an example physical topology with several tunnel endpoints, while FIG. 12 shows an example logical topology created from the physical topology through the control of the network controller cluster.

As shown in FIG. 11, the TOR switch 1025 has two ports that are connected to machines associated with two different entities. Specifically, port 1, which is paired with VLAN 1, is connected to a machine (e.g., computer) that is associated with a first entity (e.g., a client, customer, or tenant). Port 2, which is paired with VLAN 2, is connected to another machine that is associated with a second entity. The figure conceptually shows that two ports are connected to different machines for different entities as port 1 has a lighter shade of gray than port 2.

In relation to the port and VLAN pairing, when a hardware switch receives traffic from a forwarding element (e.g., a hypervisor), the hardware drops that packet on its physical port. At that point, the hardware switch might be trunking multiple VLANs. In some embodiments, the system (e.g., the network controller cluster) keeps track of the VLANs and its mapping to the VNI. For example, there might be a logical switch 1 with a VNI 1, and VLAN1 on port 1 is bridged to that logical switch. What this means is that when the physical switch receives a packet for VNI 1, it will essentially drop the packet on its port 1, using the VLAN1. When you are directly attaching a machine (e.g., a server computer) to an L2 hardware switch, there is no L3 tunnel established between the switch and the machine. So, instead of the VNI, the L2 VLAN is used to distinguish traffic for different entities (e.g., tenants, customers, etc.). In other words, this is essentially a translation or mapping mechanism from one side to the other. On one side, there is the tunnel IP fabric, where you use VNI, and on the other side, there is the physical L2 fabric, where you cannot use VNI because it is connecting directly to the machine.

Similar to the TOR switch 1025, each hypervisor (1015 or 1020) is communicatively coupled to machines that are associated with different entities. This is shown by the virtual interfaces (VIFs) on the hypervisors 1015 and 1020. In some embodiments, a VIF is an interface that connects a virtual machine (VM) to a software switch. The software switch provides connectivity between the VIFs and the hypervisor's physical interfaces (PIFs), and handle traffic between VIFs collocated on the same hypervisor.

VIF1 on hypervisor 1015 and VIF2 on hypervisor 1020 are each connected to a VM associated with the first entity. As mentioned above, port 1 of the TOR switch 1025 is also connected to a machine associated with this first entity. On the other hand, VIF3 on hypervisor 1015 and VIF4 on hypervisor 1020 are connected to VMs of the second entity. Port 2 of the TOR switch 1025 is connected to a machine associated with this second entity. FIG. 11 conceptually shows that VIFs are connected to different VMs for different entities as the VIFs for the first entity's VM has a lighter shade of gray than the VIFs for the second entity's VMs.

The network controller cluster of some embodiments creates logical switches 1205 and 1210 by assigning different virtual network identifiers (VNIs) for different entities (e.g., clients, customers, tenants). This is shown in FIG. 12 because each of the logical switches is assigned a unique VNI. Specifically, the first entity is assigned a VNI of 1, and the second entity is assigned a VNI of 2.

Network traffic between the separate tunnel endpoints 1015, 1020, and 1025 are encapsulated with the two VNIs. The encapsulation creates two separate broadcast domains for the machines of the two entities. Accordingly, the logical switch 1205 has logical ports that are associated with the machines associated with the first entity, and the logical switch 1210 has logical ports that are associated with the machines associated with the second entity.

As shown in FIG. 12, the logical switch 1205 has a logical port 1, which is associated with VIF1 of the hypervisor 1015, logical port 2, which is associated with VIF2 of the hypervisor 1020, and a logical tunnel port 1, which is associated with the port 1 and VLAN 1 pair of the TOR switch 1025. These VIFs and the port and VLAN pair are all connected to the machines associated with the first entity. In the logical abstraction, there are several logical ports. In some embodiments, each port has to have an attachment to send or receive traffic. The attachment is shown adjacent to the port number. For example, port 1 and VLAN1 of the physical switch is attached to LTP. Also, the names of the ports are symbolic name. In the system, each port may be identified by a universally unique identifier UUID, and that identifier is unique for each port.

On the other hand, the logical switch 1205 has a logical port 3, which is associated with VIF3 of the hypervisor 1015, logical port 4, which is associated with VIF4 of the hypervisor 1020, and a logical tunnel port 2, which is associated with the port 2 and VLAN 2 pair of the TOR switch 1025. These VIFs and the port and VLAN pair are all connected to the machines associated with the second entity.

C. Example Process for Configuring Hardware

As mentioned above, some embodiments connect a wide range of third party devices, ranging from top-of-rack switches to appliances such as firewalls, load balancers, etc., to managed virtual networks. In the data plane, tunnels are used to extend the virtual network overlay among the hypervisors and third party devices. A variety of tunneling encapsulations may be used (VXLAN, STT, GRE, etc.). In the control plane, the one or more controllers provide sufficient information to a device (e.g., a third party device) to enable it to connect a "service" to a virtual network. The definition of a service in this context is dependent on the third party device. For example, it could be a firewall instance, or a VLAN to be bridged into a virtual network by a TOR switch.

In some embodiments, the exchange of information takes place using a database that resides in the device (e.g., third party device). In the case where a physical switch is to be connected to a managed virtual network, the switch provides an inventory of its physical ports to a set of network controllers via a database protocol. This provides the set of network controllers with information that allows it to manage physical ports much as it does virtual ports. In other words, physical ports can be attached to virtual networks; policies can be attached to the ports, etc.

When connecting higher-level services (e.g. firewalls, load balancers, etc.) to virtual networks, different mechanisms can be used to create a binding between a service instance and a virtual network. For example, the management interface to the device (e.g., the third party device) could provide this capability, using a universally unique identifier (UUID) of the virtual network (provided by the set of network controller using the database protocol described herein) to perform the mapping.

From a data plane perspective, a device (e.g., third party box) needs to at least some of the following: (1) receive packets on a tunnel from a virtual switch (e.g., OVS) instance and forward them into the appropriate service context or port on the device, (2) forward packets from a given context or port to the appropriate virtual switch instance over a tunnel (in some cases, the appropriate virtual switch instance may be in a service node); (3) apply the appropriate tunnel encapsulation when forwarding packets to virtual switch instances (this includes both tunnel type (VXLAN, GRE, etc.) and appropriate keys, VNIs, etc.), (4) in some cases, replicate packets to multiple virtual instances, and in some cases, perform some data plane learning.

The database protocol described herein enables the hardware to perform these data plane functions. It also allows information to be fed by the hardware to the set of network controllers to allow the correct forwarding of packets from managed virtual networks to third party devices. Notably, a hardware switch (TOR switch) can notify the set of network controllers of the addresses (MAC addresses) that have been learned on its physical ports so that the set of network controller can facilitate in forwarding packets destined for those addresses toward the hardware switch.

The database server provides a means to exchange information between a device (e.g., third party device) and the set of network controllers. The database server resides on the device, and has multiple clients: a local client, and a remote client (e.g., a network controller). The network controller and the third party device exchange information by reading and writing to the common database resident on the device. For example, a device can notify the network controller that it has a certain set of physical ports available by writing to the database, which is then read by the network controller. Similarly, one or more network controllers can instruct a device to connect a physical port to a particular logical network by writing an entry into a table containing such mappings.

Figure 13:
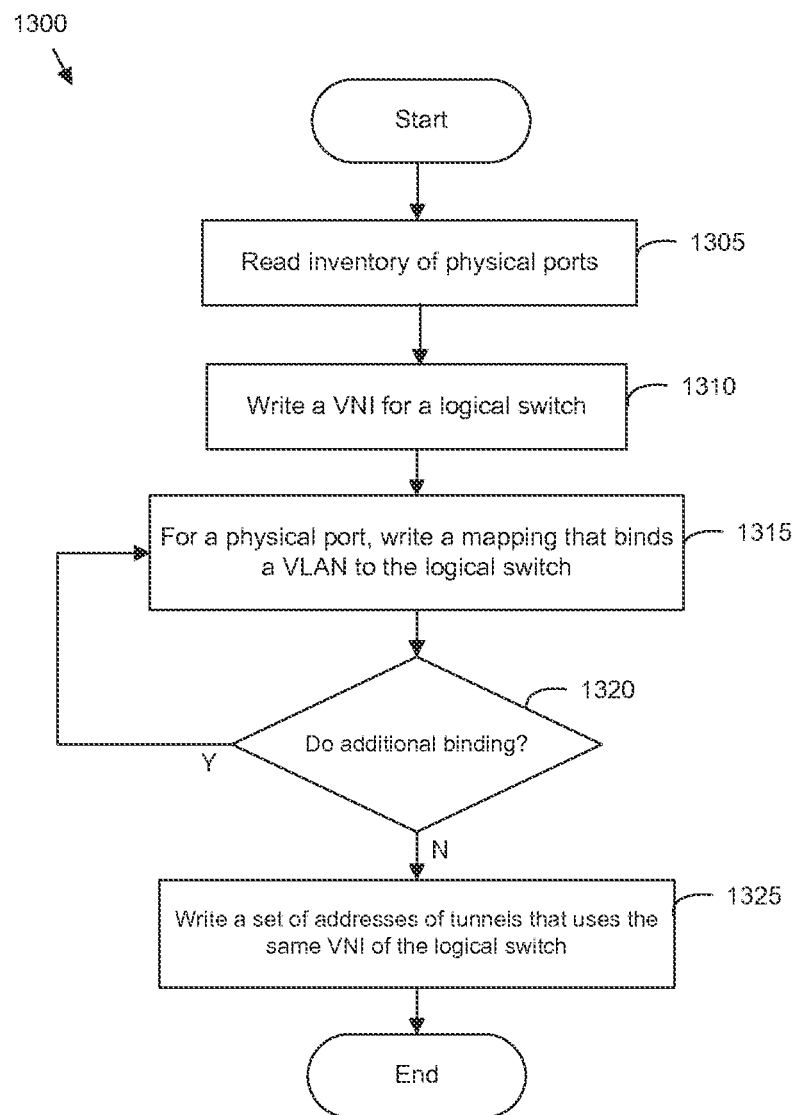
FIG. 13 conceptually illustrates a process that some embodiments perform to access such a database to implement virtual networks.

FIG. 13 conceptually illustrates a process 1300 that some embodiments perform to exchange management data with such a device. In some embodiments, the process 1300 is performed by a set of one or more network controllers. The process 1300 begins when with it communicates with a database server executing on the device. As shown, the process 1300 reads (at 1305) and inventory of physical ports from the database. The process 1300 then writes (at 1310) to the database a virtual network identifier (VNI) for identifying a logical switch. For example, there can be one hypervisor and one TOR switch, there can be multiple different logical networks but only a single tunnel between the hypervisor and the TOR switch. So, the VNI is used to identify one of the different logical network s when sending traffic between two forwarding elements (e.g., between the hypervisor and the TOR, between two hypervisors, between two TOR switches, etc.).

Accordingly, the VNI is a network identifier. Depending on the protocol, this is typically some bit of data (e.g., 24 bit) to allow some amount of (e.g., 16 million) logical networks. In some embodiments, each VNI represents a virtual Layer-2 broadcast domain and routes can be configured for communication based on the VNI. Different protocols may give this identifier different name, such as tenant network identifier, virtual private network identifier, etc.

At 1315, the process, for a physical port of the hardware, writes to the database a mapping that binds a VLAN to the logical switch. The process can perform these operations for multiple physical ports. Accordingly, the process 1300 determines (at 1320) whether to do additional binding. If so, the process returns to 1315, which is described above. Otherwise, the process 1300 proceeds to 1325. The process 1300 writes (at 1325) to the database addresses (e.g., IP addresses) of a set of tunnels that uses the same VNI of the logical switch. The process 1300 then ends.

Some embodiments perform variations on the process 1300. The specific operations of the process 1300 may not be performed in the exact order shown and described. For example, the process might read the inventory of physical ports with one transaction and later perform a number of other transactions to write to the database. The specific operations may not be performed in one continuous series of operations, and different specific operations may be performed in different embodiments. As an example, the process might iteratively perform the operations multiple times to connect the hardware to another virtual network. Furthermore, the process 1300 could be implemented using several sub-processes, or as part of a larger macro process.

Having described an example process, example applications of the process will now be described in the following sub-sections.

1. Connecting Physical Workloads to a Virtual Network

The following sub-section provides an example of using the process 1300 to connect some physical servers (e.g., desktop computers) to a virtual network. In this example, a physical switch (e.g., a VXLAN-capable L2 switch) provides the gateway function between the physical servers and the virtual network. The physical switch runs an instance of a database server. One client of the database server is local to the switch, and at least one other client runs inside a network controller.

In some embodiments, initial configuration of the VXLAN gateway is performed using out-of-band mechanisms, such as the command line interface (CLI) of the gateway. Such configuration would include the configuration of physical ports, providing an IP address of the network controller, etc., but no virtual network provisioning. The local database client will populate the database with this configured information, making it available to the network controller.

The creation of virtual networks is handled by protocols calls to the network controller. To simply the discussion, it is assumed that the virtual network is a VXLAN. Further, protocol calls will request that network controller connect physical ports, or 802.1q-tagged ports, to the VXLAN. The network controller of some embodiments then writes the following information into the database on the physical switch.

The VNI for the VXLAN

The set of tunnels that instantiate the VXLAN. As mentioned above, each of the tunnels may be identified by the IP address of the endpoint on which it terminates.

A set of mappings of <port, 802.1q tag> pairs to the logical switch (in some embodiments, the tag may be omitted if the entire physical port is to be mapped to the logical switch).

At this point, the VXLAN exists, and a set of (possibly tagged) physical ports is mapped to the VXLAN. Further protocol calls to the network controller are used to connect VMs to the VXLAN. To enable the physical switch to send packets to those VMs, the network controller writes MAC addresses of the VM s on the database on the physical switch. For traffic in the other direction, from VMs towards the physical switch, the client in the physical switch also writes learned MAC addresses of physical servers connected to its ports. Example of such operations will be described below by reference to FIGS. 14 and 15. In some cases, it is also may be necessary to deal with unknown MAC addresses, at least for packets destined to the physical world. This is handled as a special case of multicast, with the "unknown" MAC address pointing to a set of one or more tunnels. An example of such special case will be described below by reference to FIG. 19.

In the example described above, the VXLAN successfully emulates an L2 switch connecting the VMs to the gateway, with no flooding of traffic taking place within the VXLAN to discover the location of MAC addresses. In some embodiments, Address Resolution Protocol (ARP) requests may be flooded via replication at a service node.

2. Connecting a Higher Level Service to a Virtual Network

The following sub-section provides an example of using a variation on the process 1300 to connect a device providing higher-level services, such as a firewall or a load-balancer, to a logical network that is managed by the controller cluster. In this case, the sequence of operations is slightly simplified compared to the preceding example.

The initial configuration of the device (e.g., third party device) may vary from one device to another. In some embodiments, the initial configuration includes providing the device with an IP address of the network controller (e.g., through the device's CLI or a management console). The device runs an instance of the database server. One client of the database server is local to the device, and at least one other client runs inside a network controller.

The client in the device writes to the database one or more IP addresses on which it can terminate VXLAN tunnels. At this point, the network controller is able to create logical networks that connect to the device.

Logical network creation is triggered by a database protocol call to the network controller. The network controller of some embodiments then writes the following information into the database on the device.

The VNI for the VXLAN

The set of tunnels that instantiate the VXLAN. As mentioned above, each of the tunnels may be identified by the IP address of the endpoint on which it terminates.

A set of MAC to physical locator bindings, representing the tunnels that should be used to reach machines (e.g., VMs) that are part of this logical network.

In some embodiments, the network controller provides mechanisms to bind an instance of a service provided by the device (e.g., third party device) to the logical network. For example, the device CLI could be used to create an instance of a service and bind it to a particular logical network. In some embodiments, each logical network in the database has a unique name, independent of the tunneling mechanism that is used to create the logical network. This name should be used for bindings rather than the VXLAN-specific VNI.

In some embodiments, the device writes the MAC address of the service in the MAC to physical locator entries for the logical switch. If the service is implemented in a VM, this would be the MAC address of the virtual network interface card (VNIC). In some embodiments, ARP requests are handled by replication at a service node.

IV. Exchanging Forwarding State with Hardware Through Asynchronous Notifications The previous section described example of configuration hardware to add the hardware to a managed virtual network. Once the hardware is configured, the network controller of some embodiments exchanges forwarding state with the hardware. As an example, a hardware switch can publish its forwarding state by having its database client write a learned MAC address to a database table. This will in turn cause the database server to push the update to a database client executing on a network controller. The network controller can then notify other forwarding elements (e.g., software switches, hardware switches) regarding the update.

In some embodiments, uploading the MAC addresses is a continuous process. The hardware switch will keep on learning MAC addresses. For example, the hardware switch might have various time mechanisms. If a machine is moved away or silent for a long period time, the hardware switch might remove the machine's MAC address. The hardware switch might add the address again if it detects that machine is connected to one of its physical ports. In some embodiments, each MAC address is published by the forwarding element (e.g., hardware switch, hypervisor) with the forwarding element's IP address.

One the other side, the network controller knows the MAC addresses of the virtual machines connected to software switches. To stress, the MAC addresses of the virtual machines are known address and not learned MAC addresses. These known MAC address are being pushed with the network controller writing to the hardware switch's database. One reason they are known rather than learned is that VMs are connected to virtual interfaces (VIFs) and there is no timeout mechanism associated with the VIFs. The VM is either associated with one VIF or not associated with that VIF. In some embodiments, the forwarding state of a software switching element is asynchronously sent from the network controller to the hardware switching element when the software's forwarding state has changed (e.g., a VM is attached to a VIF).

Figure 14:
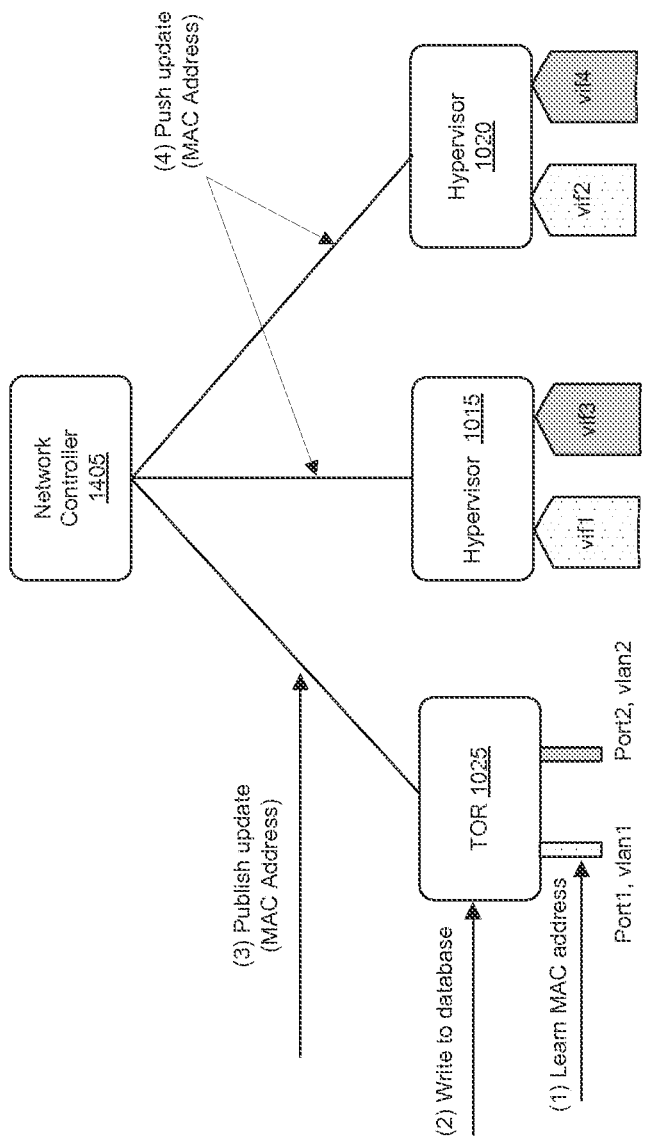
FIG. 14 provides a data flow diagram that shows a top of rack (TOR) switch that publishes a MAC address of a machine that is connected to one of its port.

FIG. 14 provides a data flow diagram that shows a top of rack (TOR) switch 1025 that publishes an address (e.g., a MAC address) of a machine that is connected to one of its ports. As shown, the data flow begins when the TOR switch 1025 learns a MAC address of the machine. Upon learning the MAC address, the TOR switch 1025 might generate a flow based on the MAC address and write the flow in its memory (e.g., CAM, TCAM). In addition, a program on the switch's software stack might send a message to the database client on the switch regarding the learned MAC address. The database client then sends a transaction message to the database server with the MAC address. In some embodiments, the transaction message includes the physical port number a VLAN identifier.

When the database is updated with the learned MAC address, the database server of some embodiments sends an update notification to a network controller 1405 (e.g., in a network controller cluster). In some embodiments, the network controller has a database client that has been configured to monitor updates to a table or a subset of table using the database protocol. For example, the client might have previously sent a monitor or registration request with a set of parameters (e.g., the columns being monitored, what kind of transactions are being monitored, such as initial, insert, delete, modify, etc.). The database server of some embodiments sends an update notification that has a copy of the table or a subset of the table (e.g., a record) that was updated. Several examples of a client on monitoring a database are described above by reference to FIGS. 6 and 7.

As shown in FIG. 14, the TOR switch 1025 publishes the MAC address to the network controller 1405. In some embodiments, the MAC address is sent with a virtual network identifier (VNI) of the logical switch and an IP address of the TOR switch 1025. The network controller receives the information and then pushes it down to the hypervisors 1015 and 1020. Each of the hypervisors 1015 and 1020 then updates its respective flow table with a flow that includes the MAC address and action to forward the packet with the same MAC address (e.g., in the header's destination MAC address field) to the TOR switch 1025. In some embodiments, the network controller 1405 receives the MAC address, computes a flow, and sends the flow to each of the hypervisors 1015 and 1020. The flow may be sent to each hypervisor using the OpenFlow Protocol. That is, instead of the database protocol (e.g., the OVDB) channel, the flow will be sent to the hypervisors using one or more OpenFlow calls. However, if a tunnel did not exist between the TOR switch 1025 and the hypervisor (1015 or 1020), then network controller would have to send instructions (e.g., the address of the TOR switch, VNIs, etc.) to the hypervisor to create the tunnel. The instructions sent to the hypervisor using the database protocol (e.g., OVSDB protocol), in some embodiments.

Figure 15:
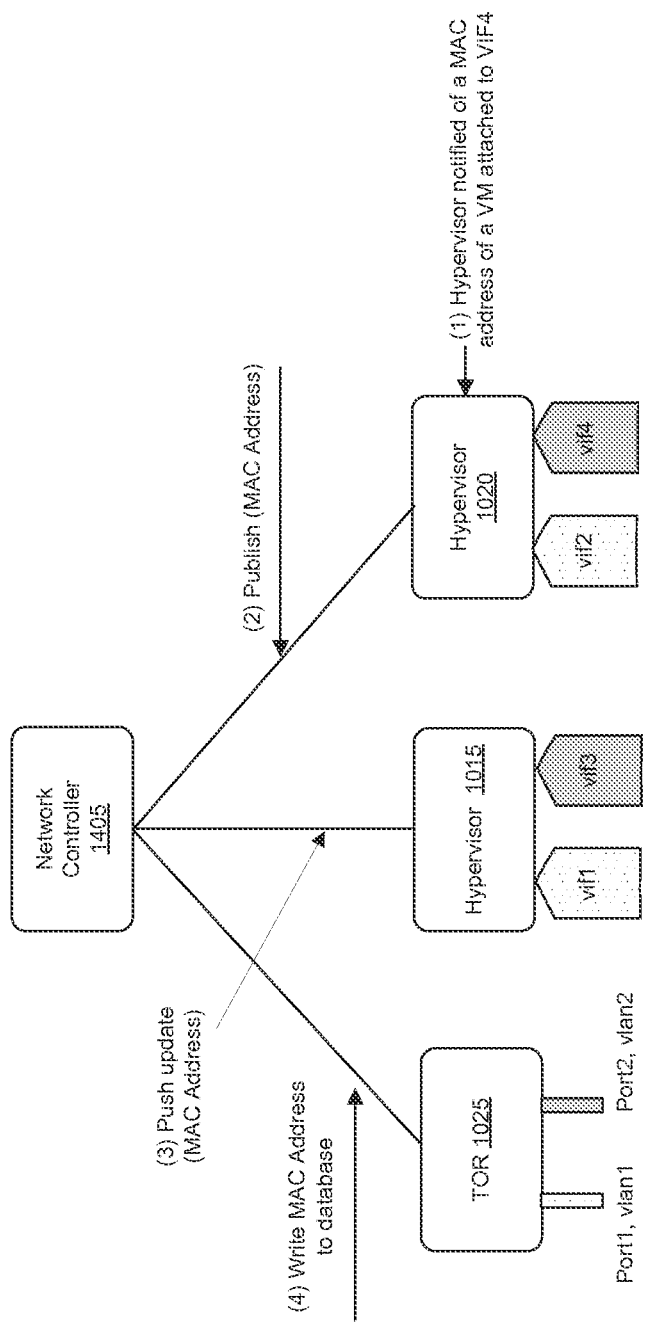
FIG. 15 illustrates a data flow diagram that shows a MAC address of a virtual machine being pushed to the TOR switch.

In the example described above, the TOR switch 1025 publishes a MAC address to the network controller 1405. FIG. 15 provides a data flow diagram that shows the hypervisor 1020 that publishing a MAC address of a virtual machine (VM) that is connected to its virtual interface (VIF). This flow begins when a new VIF is created and the VM is associated with the VIF.

As shown in FIG. 15, the hypervisor 1020 is notified of the MAC address of the VM attached to VIF4. In some embodiments, when a VM is attached to a VIF, the software switch executing on the hypervisor is notified of the MAC address of the VM. The software switch then sends the MAC address to the network controller 1405. In some embodiments, the MAC address is sent with one or more of the following: the VNI to identify the logical switch, a logical port number, and IP address of the hypervisor 1020.

Having received the information, the network controller 1405 sends the information to the hypervisor 1015 and the TOR switch 1025. The hypervisor 1415 receives the information. The hypervisor 1015 then updates its flow table with a flow that includes the MAC address and action to forward the packet with the same MAC address (e.g., in the header's destination MAC address field) to the hypervisor 1025. In some embodiments, the network controller 1405 receives the information, computes a flow, and sends the flow to the hypervisor 1015. The flow may be sent to each hypervisor using the OpenFlow Protocol. That is, instead of the database protocol (e.g., the OVDB) channel, the flow will be sent to the hypervisors using one or more OpenFlow calls.

Different from the hypervisor 1015, the network controller 1405 sends the information to the TOR switch by first creating a new transaction message. The transaction is then sent to the database server on the TOR switch 1025. The database server then updates the database based on the instructions in the message. In some embodiments, the database client on the TOR switch 1025 is notified of the update. The update is then passed to a program on the switch's software stack. The program uses the update to generate a flow that includes the MAC address and action to forward the packet with the same MAC address (e.g., in the header's destination MAC address field) to the hypervisor 1015.

V. Packet Flow Examples

The previous section described several examples of the network controller exchanging forwarding state with the dedicated hardware. Several examples of forwarding packets will now be described below by reference to FIGS. 16-19.

In these examples, a set of one or more network controllers has computed a set of flows for a software switching to forward packets to other switching elements (e.g., software switching element, hardware switching element). The set of network controllers has also exchanged forwarding state with one or more hardware switching element. Each hardware switching element has translated the state to a set of flows that it can understand to forward packet.

Figure 16:
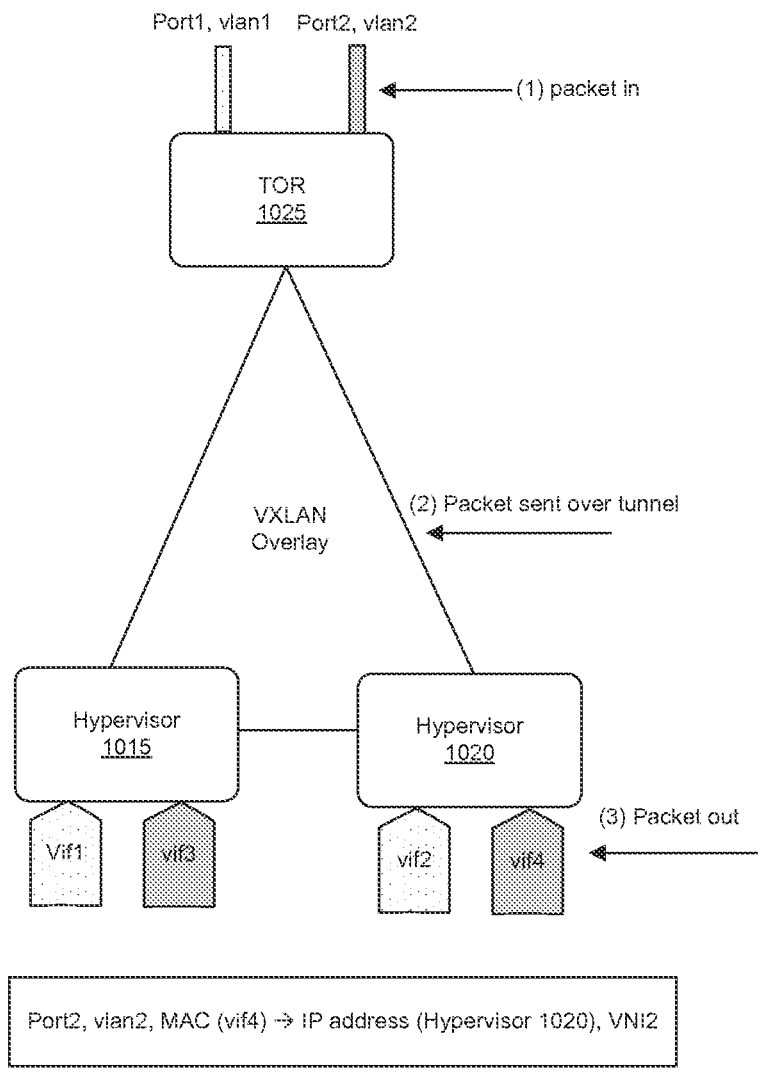
FIG. 16 illustrates a packet flow diagram flow for a known unicast.

FIG. 16 illustrates a packet flow diagram flow for a known unicast. Specifically, this figure shows how the TOR switch 1025 receiving a packet and forwarding it to the hypervisor 1020. In this example, the TOR switch 1025 has programmed a flow in its ASIC based on the information (e.g., the MAC address, VNI, etc.) received from the network controller (not shown). A machine is connected to a port. The port is associated with a VLAN identifier.

The flow begins when a packet is received though a physical port of the TOR switch 1025. The physical port is associated with a port and VLAN pairing (i.e., port 2, VLAN2). As shown by the box above the figure number, the TOR switch 1025 performs a look-up operation. For instance, when the packet is received through on port 2 and VLAN 2, the destination MAC address is already there in the packet. The TOR switch looks at what port this packet came in and what the VLAN ID is, and based on the information, it determines that the packet should be tunneled to the hypervisor 1020 using the VNI 2. In the example of FIG. 16, the hypervisor 1020 is identified by its associated IP address.

After performing the look-up operation, the TOR switch 1025 encapsulates the packet using the tunnel protocol and sends the packet over the tunnel to the hypervisor 1020. Specifically, the packet is encapsulated using the VNI (e.g., the VNI 2). Here, the TOR switch 1025 sends the packet to the hypervisor 1020 using the IP address of the hypervisor.

When the hypervisor 1020 receives the packet, it performs a flow lookup operation to output the packet to an appropriate port. Specifically, it parses the packet to identify header values, such as the destination MAC address. The hypervisor 1020 then tries to find a matching flow in its datapath or cache. If the matching flow is found, the hypervisor 1020 uses the flow to output the packet to a VM. If no matching flow is found, the hypervisor generates a flow to push into the datapath to process the packet. In this example, the packet is output to VIF4, which is associated with logical port 4 (e.g., in FIG. 12).

Figure 17:
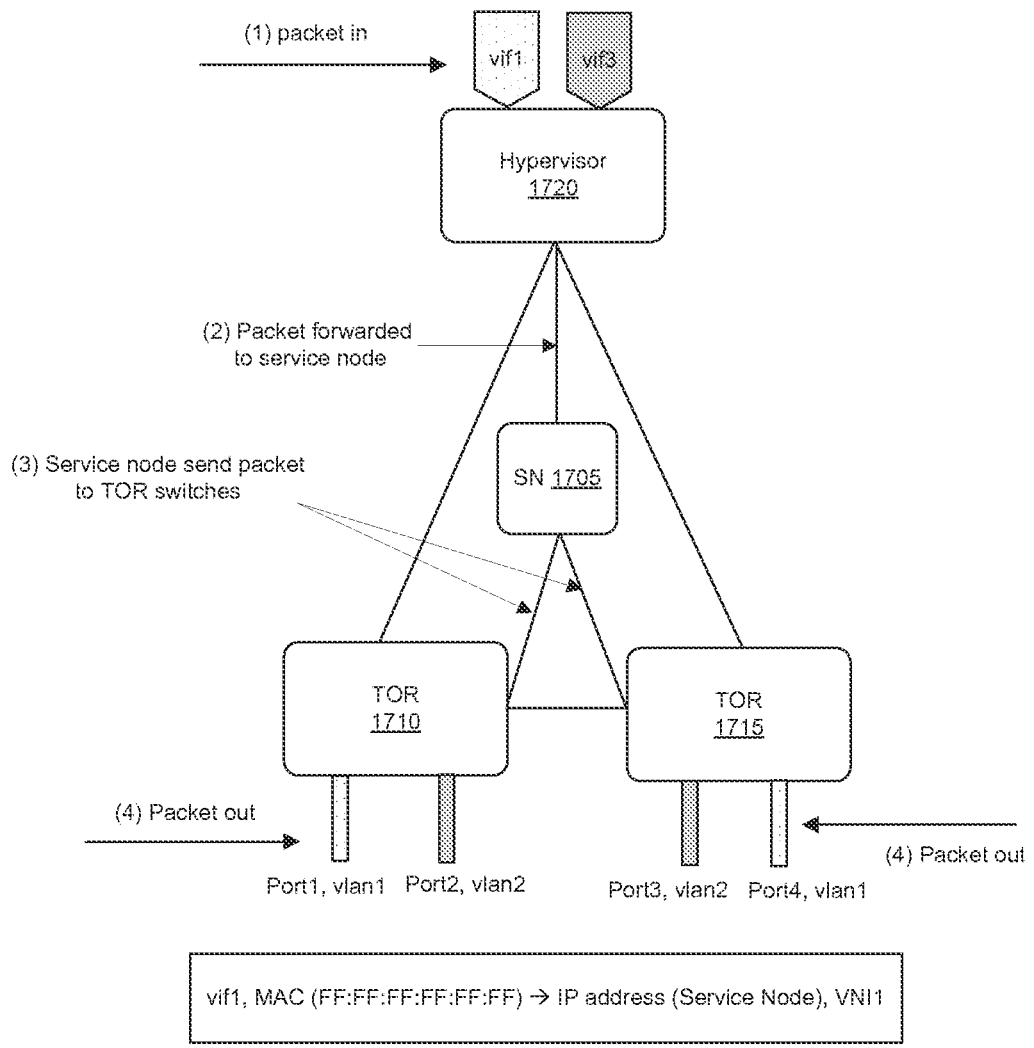
FIG. 17 illustrates a packet flow diagram flow for a multicast.

FIG. 17 illustrates a packet flow diagram for a multicast. In some embodiments, the network virtualization system utilizes a service node to perform a multicast, such as a broadcast. For example, when a hypervisor receives a packet with instructions to broadcast it, the hypervisor sends the packet to the service node. The service node then replicates the packet to one or more other hardware switching elements. One of the reasons for utilizing such a service node is that a software switching element has known addresses (e.g., MAC addresses) of machines, whereas a hardware switching element may have one or more unknown addresses of machines.

FIG. 17 shows an example of a hypervisor 1720 receiving a packet from a machine and sending the packet to a service node 1705 in order to broadcast the packet to other machines in the virtual network that are in the same broadcast domain. The flow begins when a packet is received though a virtual interface (VIF) of the hypervisor 1720.

As shown by the box above the figure number, the hypervisor 1720 performs a look-up operation. For instance, when the packet is received through VIF1, the hypervisor looks at this information and other supplemental information (e.g., the logical port number associated with the VIF), and, based on one or more pieces of those information, it determines that the packet should be tunneled to the service node 1705 using the VNI 2. In the example of FIG. 16, the service node 1705 is identified by its associated IP address.

When the service node 1705 receives the packet, it replicates the packet and sends the packet to each of the TOR switches 1710 and 1715. In some embodiments, the service node 1705 send the packet over a tunnel that is established between the service node and each of the two TOR switches 1710 and 1715. The packet is sent over the corresponding tunnel using the VNI. As shown, the service node 1705 forwards the packets to the tunnel endpoints, namely the TOR switches 1710 and 1715. The TOR switch 1710 send the packet out Port 1 and VLAN 1, and the TOR switch 1715 sends the packet out of Port 4 VLAN 1.

Figure 18:
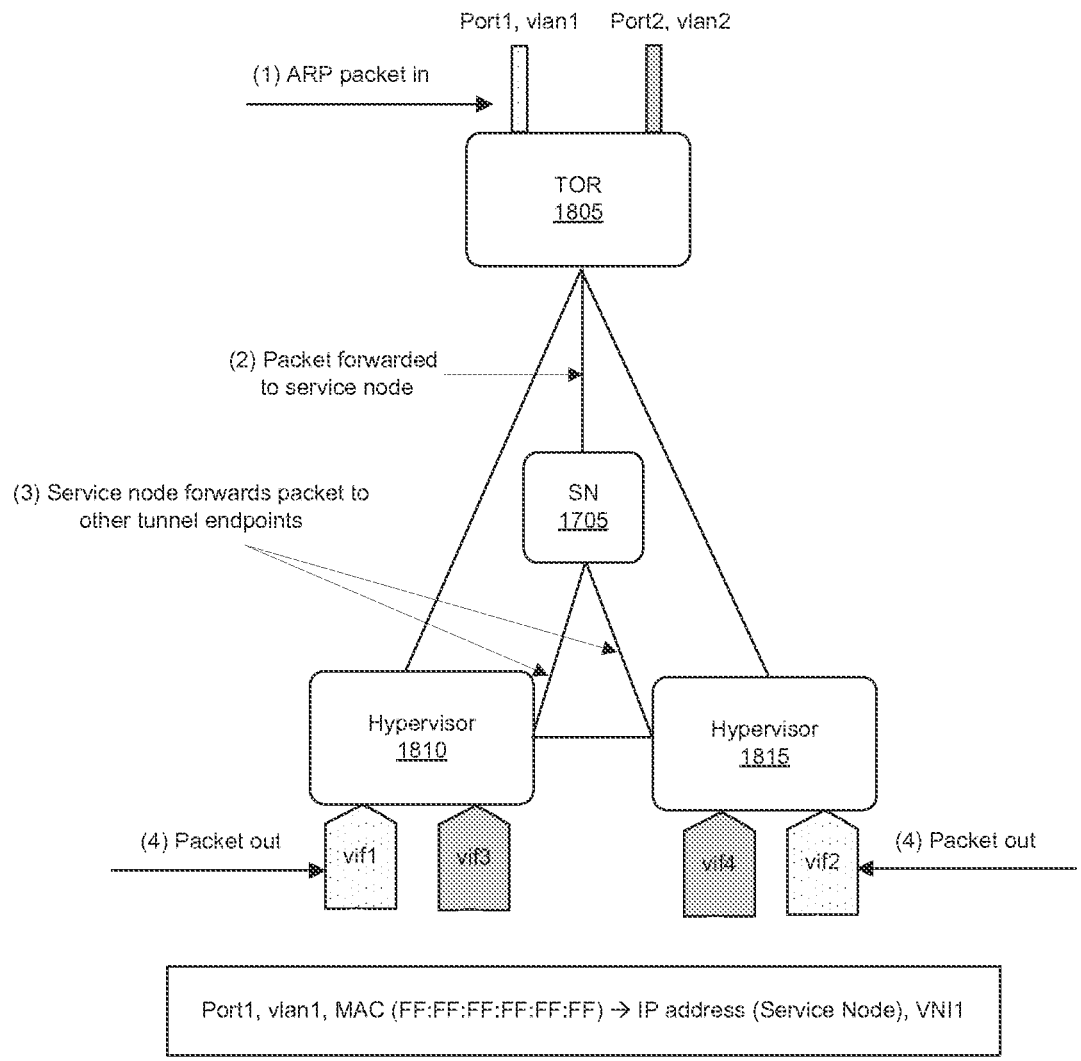
FIG. 18 shows a packet flow diagram for an Address Resolution Protocol (ARP) request.

FIG. 18 shows an example of a TOR switch 1805 receiving an Address Resolution Protocol (ARP) packet from a machine and sending the packet to a service node 1705. The ARP protocol is used to translate IP addresses to MAC addresses. In this example, the TOR switch 1805 has programmed a flow in its ASIC that identifies sending such a broadcast packet to the service node 1705. In some embodiments, the TOR switch 1805 has generated the flow with the IP address of the service node from the switch's database.

The flow begins when a packet is received though a physical port of the TOR switch 1805. The physical port is associated with a port and VLAN pairing (i.e., port 1, VLAN1). As shown by the box, the TOR switch look at what port this packet came in, what the VLAN ID is, and whether this is an ARP packet and; based on the information, it determines that the packet should be tunneled to the service node 1705 using the VNI 1.

When the service node 1705 receives the packet, the service node 1705 sends the packet to each of the hypervisors 1810 and 1815. In some embodiments, the service node 1705 sends the packet over a tunnel that is established between the service node and each of the two hypervisors 1810 and 1815. The packet is sent over the corresponding tunnel using the VNI. As shown, the service node 1705 forwards the packets to the tunnel endpoints, namely the hypervisors 1810 and 1815. The hypervisor 1810 send the packet out logical port 1 of logical switch 1 that is associated with VIF1. The hypervisor 1815 sends the packet out logical port 2 of logical switch1 that is associated with VIF2.

Figure 19:
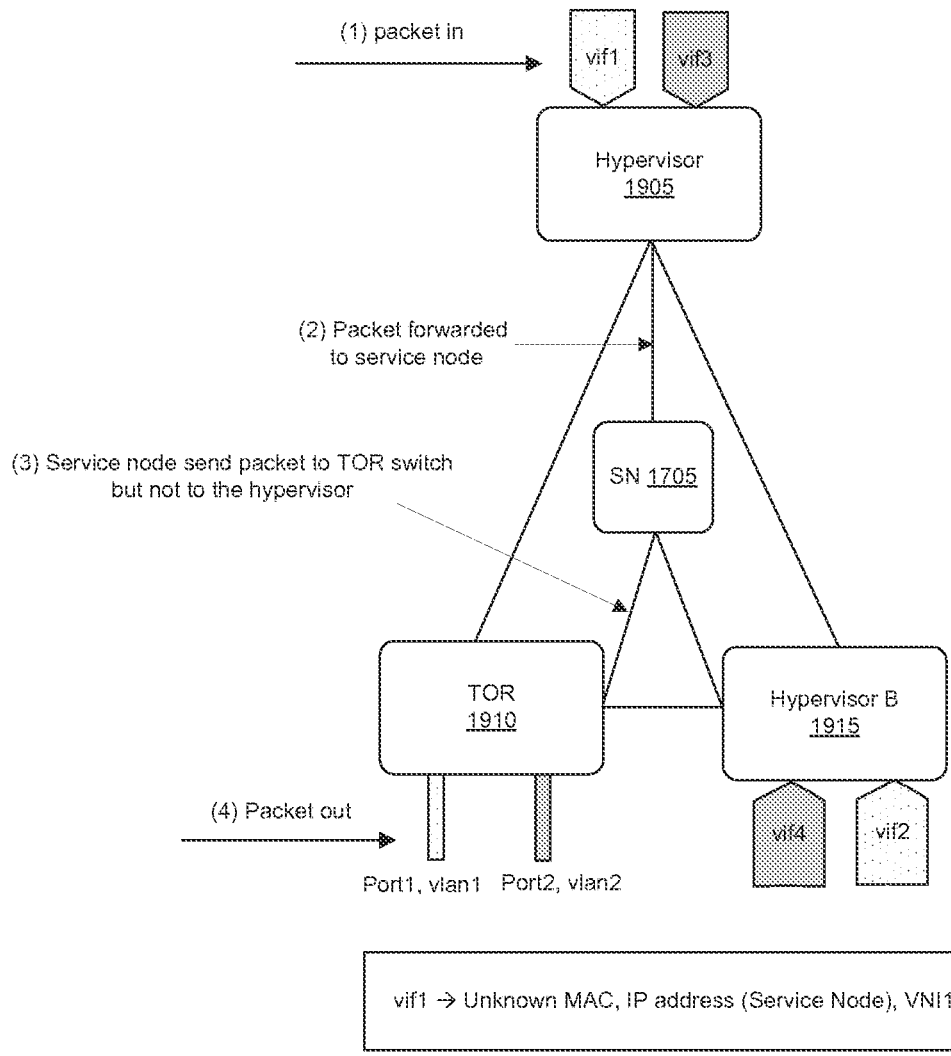
FIG. 19 illustrates a packet flow diagram flow for an unknown unicast.

FIG. 19 illustrates a packet flow diagram flow for an unknown unicast. The unknown unicast is when the destination MAC is a unicast MAC but there is no knowledge of the MAC address. For example, the network controller cluster may not recognize the MAC address. In some embodiments, the network virtualization system assumes that the VIFs have known MACs. Therefore, the hypervisors 1905 and 1915 may never receive a packet destined for an unknown unicast address. For example, if a hypervisor 1905 sends out an unknown unicast packet to a service node 1705. The service node 1705 would forward the packet each other TOR switches but not to each other hypervisors. This is because the system assumes that the TOR switch can have unknown unicast addresses behind it.

In the example of FIG. 19, the hypervisor 1905 receives a packet from a VM and calls a service node 1705. In this example, the hypervisor 1905 has flow entry to send packet with an unknown MAC address in the packet's header to the service node 1705 that is unknown to the service node 1705. As shown, the flow begins when a packet is received though the logical port 1. The logical port 1 is associated with VIF1. The hypervisor 1905 then encapsulates the packet using the tunnel protocol and sends the packet over a tunnel to the service node 1705. Specifically, the packet is encapsulated using the VNI (i.e., the VNI 1 for the logical switch 1). In some embodiments, the TOR switch 1910 sends the packet to the service node 1705 using the IP address of the service node 1705.

When the service node 1705 receives the packet, the service node 1705 sends the packet over a tunnel that is established the service node and the TOR switch 1910. However, the service node 1705 does not send the packet to the hypervisor 1915. As mentioned above, this is because the system assumes that the TOR switch 1910 can have unknown unicast behind it, while the hypervisor 1915 only has known unicast.

The packet is sent over the corresponding tunnel using the VNI. As shown, the service node 1705 forwards the packets to the tunnel endpoint, namely the TOR switch 1910. The hypervisor 1905 send the packet out one of its physical ports that is associated with the port and VLAN pairing.

VI. Example Environment

The following section will describe the environment in which some embodiments of the inventions are implemented. In the present application, switching elements and machines may be referred to as network elements. In addition, a network that is managed by one or more network controllers may be referred to as a managed network in the present application. In some embodiments, the managed network includes only managed switching elements (e.g., switching elements that are controlled by one or more network controllers) while, in other embodiments, the managed network includes managed switching elements as well as unmanaged switching elements (e.g., switching elements that are not controlled by a network controller).

In some embodiments, a network controller cluster controls one or more managed switching elements that are located at the edge of a network (e.g., tunnel endpoints, edge switching elements, or edge devices). In addition to controlling edge switching elements, the network controller cluster of some embodiments also utilize and control non-edge switching elements that are inserted in the network to simplify and/or facilitate the operation of the managed edge switching elements. For instance, in some embodiments, the network controller cluster requires the switching elements that the network controller cluster controls to be interconnected in a hierarchical switching architecture that has several edge switching elements as the leaf nodes in the hierarchical switching architecture and one or more non-edge switching elements as the non-leaf nodes in this architecture. In some such embodiments, each edge switching element connects to one or more of the non-leaf switching elements, and uses such non-leaf switching elements to facilitate the communication of the edge switching element with other edge switching elements.

Some embodiments employ one level of non-leaf (non-edge) switching elements that connect to edge switching elements and in some cases to other non-leaf switching elements. Other embodiments, on the other hand, employ multiple levels of non-leaf switching elements, with each level of non-leaf switching elements after the first level serving as a mechanism to facilitate communication between lower level non-leaf switching elements and leaf switching elements. In some embodiments, the non-leaf switching elements are software switching elements that are implemented by storing the switching tables in the memory of a standalone computer instead of an off the shelf switch. As described herein, the leaf or non-leaf switching elements can be extended beyond software switching elements to hardware switching elements.

As mentioned above, some embodiments provide a network controller cluster that communicates with a wide range of devices (e.g., third-party hardware), ranging from switches to appliances such as firewalls, load balancers, etc. The network controller cluster communicates with such devices to connect them to its managed virtual networks. The network controller cluster can define each virtual network through software switches and/or software appliances. The common feature of the different types of equipment or boxes is that each of them has a database server that is controlled through a protocol.

Figure 20:
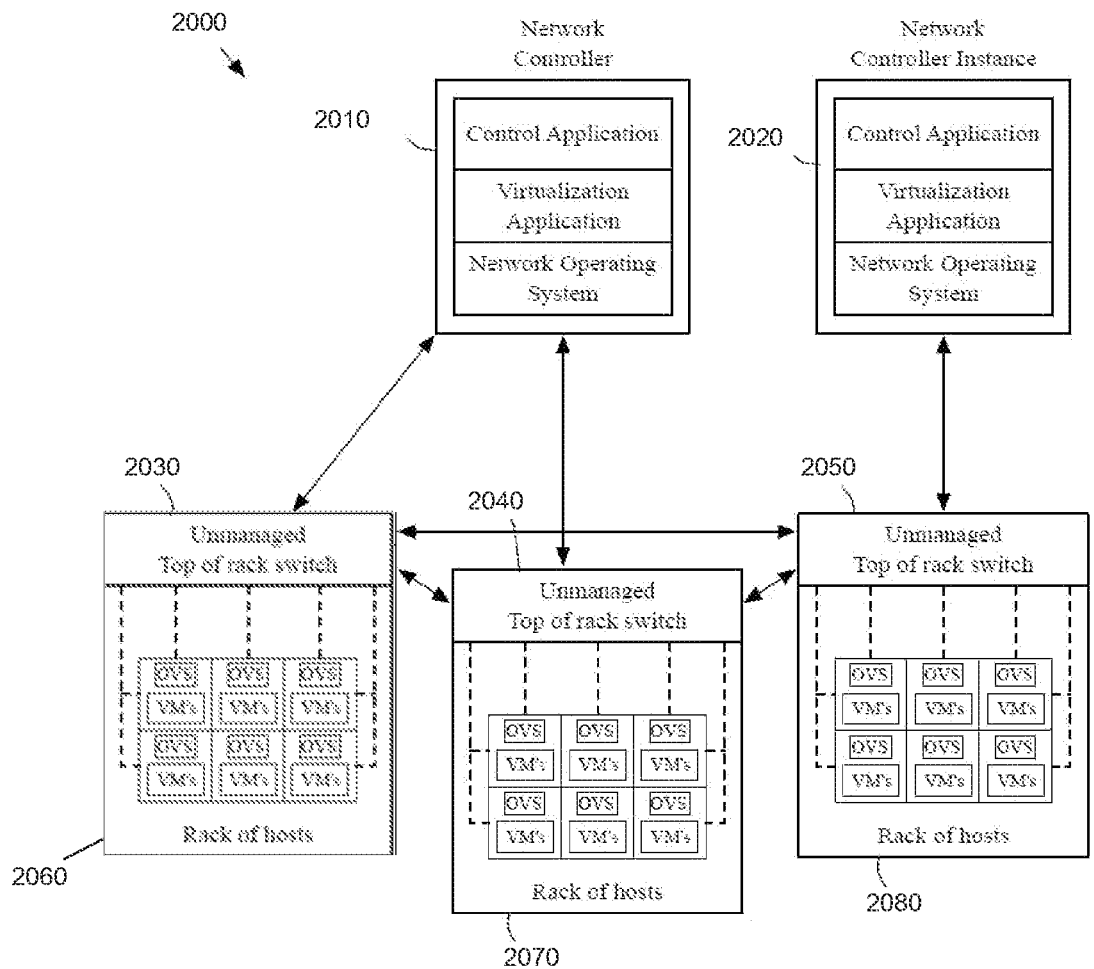
FIG. 20 conceptually illustrates an example of a network control system of some embodiments that manages hardware and software forwarding elements.

The network controller of some embodiments can be implemented in software as an instance of an application. As illustrated in FIG. 20, the network controllers 2010 and 2020 are instances of a software application. As shown, each of the network controllers 2010 and 2020 includes several software layers: a control application layer, a virtualization application layer, and a networking operating system layer.

In some embodiments, the control application layer receives user input that specifies a network-switching element. The control application layer may receive the user input in any number of different interfaces, such as a graphical user interface (GUI), a command line interface, a web-based interface, a touchscreen interface, etc. In some embodiments, the user input specifies characteristics and behaviors of the network switching element, such as the number of switching element ports, access control lists (ACLs), network data forwarding, port security, or any other network switching element configuration options.

The control application layer of some embodiments defines a logical data path set based on user input that specifies a network switching element. As noted above, a logical data path set is a set of network data paths through managed switching elements that are used to implement the user-specified network switching element. In other words, the logical data path set is a logical representation of the network switching element and the network switch's specified characteristics and behaviors.

Some embodiments of the virtualization application layer translate the defined logical data path set into network configuration information for implementing the logical network switching element across the managed switching elements in the network. For example, the virtualization application layer of some embodiments translates the defined logical data path set into a corresponding set of data flows. In some of these cases, the virtualization application layer may take into account various factors (e.g., logical switching elements that are currently implemented across the managed switching elements, the current network topology of the network, etc.), in determining the corresponding set of data flows.

The network operating system layer of some embodiments configures the managed switching elements' routing of network data. In some embodiments, the network operating system instructs the managed switching elements to route network data according to the set of data flows determined by the virtualization application layer.

In some embodiments, the network operating system layer maintains several views of the network based on the current network topology. One view that the network operating system layer maintains is a logical view. The logical view of the network includes the different logical switching elements that are implemented across the managed switching elements, in some embodiments. Some embodiments of the network operating system layer maintain a managed view of the network. Such managed views include the different managed switching elements in the network (i.e., the switching elements in the network that the network controllers control). In some embodiments, the network operating system layer also maintains relationship data that relate the logical switching elements implemented across the managed switching elements to the managed switching elements.

While FIG. 20 (and other figures in this application) may show a set of managed switching elements managed by a network controller, some embodiments provide several network controllers (also referred to as a cluster of network controllers or a control cluster) for managing the set of managed switching elements (e.g., virtual switches, hardware switches). In other embodiments, different control clusters may manage different sets of managed switching elements. Employing a cluster of network controllers in such embodiments to manage a set of managed switches increases the scalability of the managed network and increases the redundancy and reliability of the managed network. In some embodiments, the network controllers in a control cluster share (e.g., through the network operating system layer of the network controllers) data related to the state of the managed network in order to synchronize the network controllers.

As mentioned above, the network control system of some embodiments can manage both physical switching elements and software switching elements. FIG. 20 illustrates an example of such a network control system. In particular, this figure conceptually illustrates a network control system 2000 of some embodiments for managing TOR switching element 2030 and OVSs running on hosts in the racks of hosts 2070 and 2080.

In this example, the managed switching element 2030 and the OVSs running on the hosts in the racks of hosts 2070 and 2080 are edge-switching elements because they are the last switching elements before end machines in the network. In particular, the network controller 2010 manages the TOR switching element 2010 and the OVSs that are running on the hosts in the rack of hosts 2060, and the network controller 2020 manage the OVSs that are running on the hosts in the rack of hosts 2080.

Figure 21:
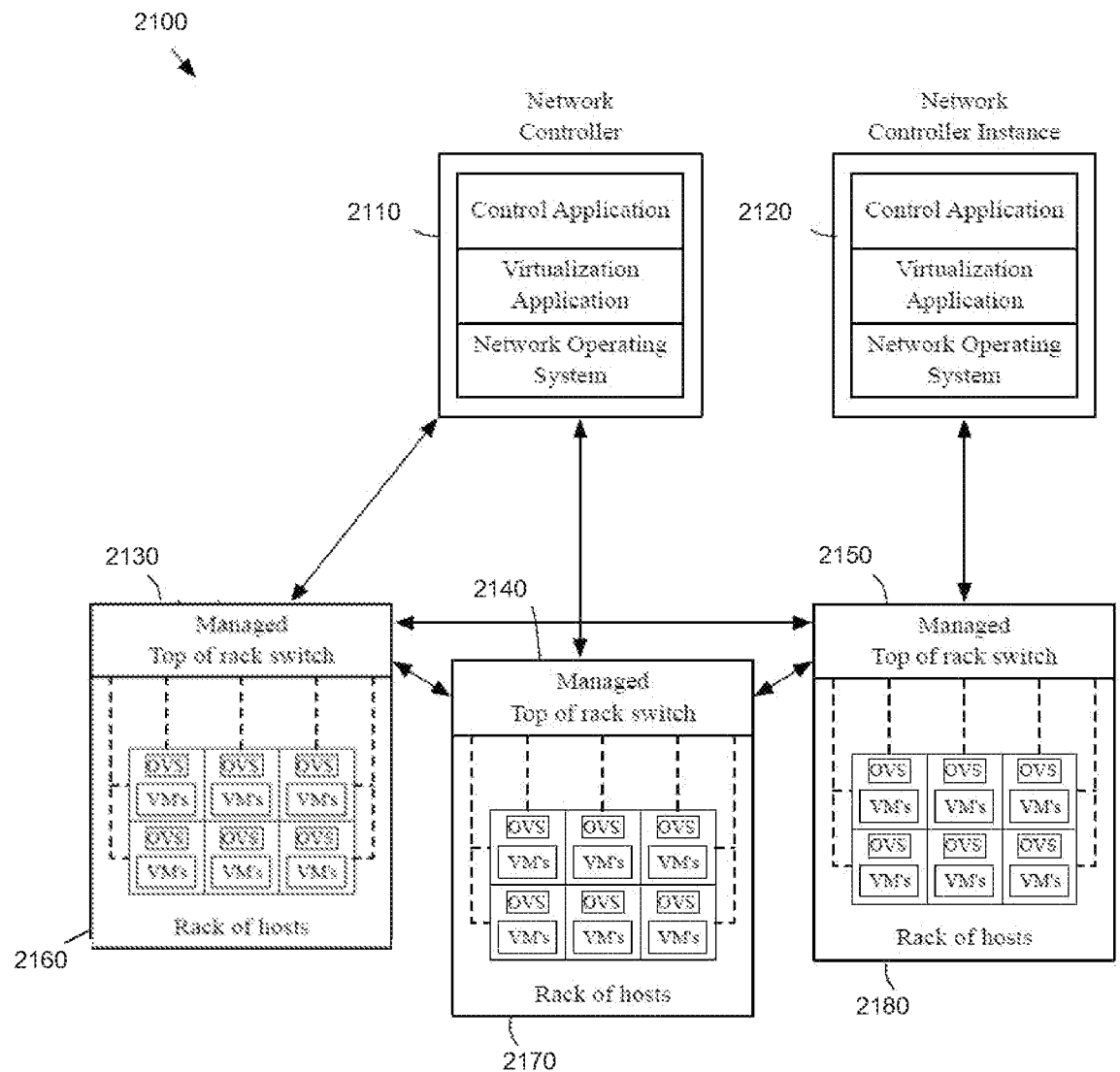
FIG. 21 conceptually illustrates an example of a network control system of some embodiments that manages hardware and software forwarding elements.

The above figures illustrate examples of network controllers that control edge-switching elements in a network. However, in some embodiments, the network controllers can control non-edge-switching elements as well. FIG. 21 illustrates a network control system that includes such network controllers. In particular, FIG. 21 conceptually illustrates a network control system 2100 of some embodiments for managing TOR switching elements 2130-21210 and OVS running on hosts in the racks of hosts 2170 and 2180.

As shown in FIG. 21, the network controllers 2110 and 2120 manage edge switching elements and non-edge switching elements. Specifically, the network controller 2110 manages the TOR switching elements 2130 and 2120, and the OVSs running on the hosts in the rack of hosts 2170. The network controller 2120 manages TOR switching element 2180 and the OVSs running on the hosts in the rack of hosts 2180. In this example, the TOR switching element 2130 and the OVSs running on the hosts in the racks of hosts 2170 and 2180 are edge-switching elements, and the TOR switching elements 2140 and 2105 are non-edge switching elements.

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
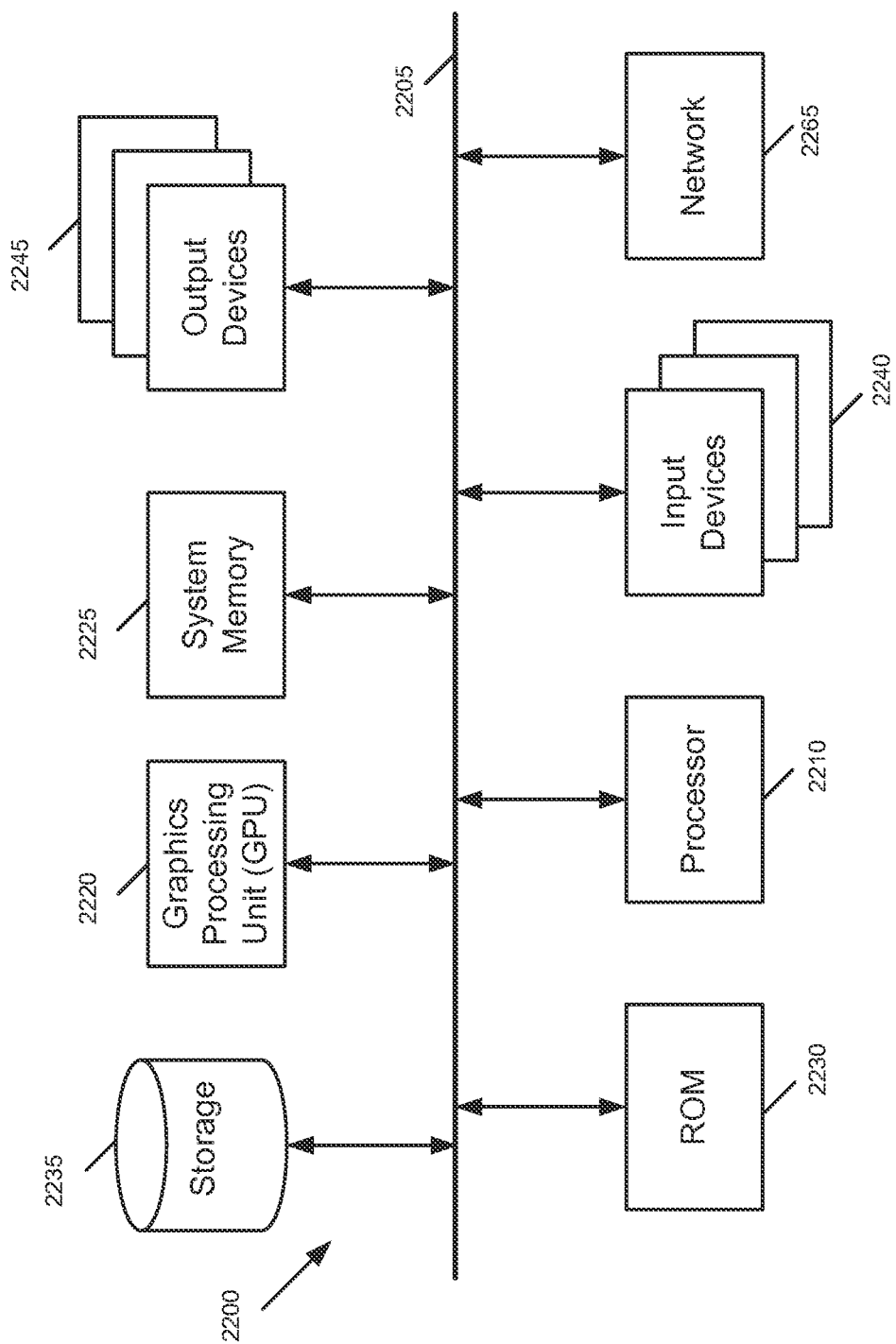
FIG. 22 conceptually illustrates an electronic system with which some embodiments of the invention are implemented.

FIG. 22 conceptually illustrates an electronic system 2200 with which some embodiments of the invention are implemented. The electronic system 2200 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the system memory 2225, and the permanent storage device 2235.

From these various memory units, the processing unit(s) 2210 retrieves instructions to execute and data to process in order to execute the processes of the invention. The processing unit(s) may be a single processor or a multi-core processor in different embodiments.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash memory device, etc., and its corresponding drive) as the permanent storage device. Like the permanent storage device 2235, the system memory 2225 is a read-and-write memory device. However, unlike storage device 2235, the system memory 2225 is a volatile read-and-write memory, such a random access memory. The system memory 2225 stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieves instructions to execute and data to process in order to execute the processes of some embodiments.

The bus 2205 also connects to the input and output devices 2240 and 2245. The input devices 2240 enable the user to communicate information and select commands to the electronic system. The input devices 2240 include alphanumeric keyboards and pointing devices (also called "cursor control devices"), cameras (e.g., webcams), microphones or similar devices for receiving voice commands, etc. The output devices 2245 display images generated by the electronic system or otherwise output data. The output devices 2245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 22, bus 2205 also couples electronic system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 8 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for a service node to forward packets through a network, the method comprising:
   at the service node:
      receiving an unknown unicast packet for a particular virtual network from a forwarding element that implements the virtual network with a plurality of other forwarding elements that include hardware and software forwarding elements;
      replicating the unknown unicast packet; and
      sending a replica of the unknown unicast packet to each hardware forwarding element in a first set of hardware forwarding elements comprising at least two hardware forwarding elements from which the service node did not receive the unknown unicast packet,
      wherein a hardware forwarding element in the first set of forwarding elements outputs the unknown unicast packet to a port of the hardware forwarding element when the hardware forwarding element identifies the port as being connected to a machine with an address that is the same as a destination address of the unknown unicast packet.

2. The method of claim 1, wherein the first set of forwarding elements includes only hardware forwarding elements.

3. The method of claim 2, wherein:
   the virtual network is implemented by the first set of hardware forwarding elements and a second set of software forwarding elements, and connects first and second sets of machines;
   each hardware forwarding element in the first forwarding-element set is a candidate forwarding element for having one or more unknown addresses of the first set of machines connected to a set of ports of the hardware forwarding element; and
   each software forwarding element only has one or more known addresses of the second set of machines attached to a set of virtual interfaces of the software forwarding element.

4. The method of claim 1 further comprising:
   at the service node:
      receiving a multicast packet for the particular virtual network sent from a forwarding element in the plurality of forwarding elements;
      replicating the multicast packet; and
      sending a replica packet to each hardware forwarding element in a second set of forwarding elements comprising at least two hardware forwarding elements from which the multicast packet was not received.

5. The method of claim 4, wherein a hardware forwarding element in the second set of forwarding elements outputs the multicast packet to at least one port of the hardware forwarding element when the hardware forwarding element identifies the at least one port as being connected to a machine that is a part of the particular virtual network.

6. The method of claim 1, wherein each hardware forwarding element receives the forwarding instructions to generate at least one flow to forward a known unicast packet directly to another forwarding element in the particular virtual network.

7. The method of claim 1, wherein each hardware forwarding element forwards a multicast packet directly to a software forwarding element in the particular virtual network from which the hardware forwarding element did not receive a multicast packet.

8. The method of claim 1 further comprising:
   at the service node:
      receiving an Address Resolution Protocol (ARP) packet from a forwarding element in the plurality of forwarding elements;
      replicating the ARP packet; and
      sending a replica ARP packet to a second set of forwarding elements comprising at least two forwarding elements from which the service node did not receive the ARP packet.

9. A non-transitory machine readable medium storing a service-node module for forwarding packets through a network, the service node module for execution by at least one processing unit of a computer, the service node module comprising sets of instructions for:
   receiving an unknown unicast packet for a particular virtual network from a forwarding element that implements the virtual network with a plurality of other forwarding elements that includes hardware and software forwarding elements;
   replicating the unknown unicast packet; and
   sending a replica of the unknown unicast packet to each hardware forwarding element in a first set of hardware forwarding elements comprising at least two hardware forwarding elements from which the service node did not receive the unknown unicast packet,
   wherein a hardware forwarding element in the first set of forwarding elements outputs the unknown unicast packet to a port of the hardware forwarding element when the hardware forwarding element identifies the port as being connected to a machine with an address that is the same as a destination address of the unknown unicast packet.

10. The non-transitory machine readable medium of claim 9, wherein the first set of forwarding elements includes only hardware forwarding elements.

11. The non-transitory machine readable medium of claim 10, wherein:
    the virtual network is implemented by the first set of hardware forwarding elements and a second set of software forwarding elements, and connects first and second sets of machines;
    each hardware forwarding element in the first forwarding-element set is a candidate forwarding element for having one or more unknown addresses of the first set of machines connected to a set of ports of the hardware forwarding element; and each software forwarding element only has one or more known addresses of the second set of machines attached to a set of virtual interfaces of the software forwarding element.

12. The non-transitory machine readable medium of claim 9, wherein the service node module further comprises sets of instructions for:

receiving a multicast packet for the particular virtual network sent from a forwarding element in the plurality of forwarding elements;

replicating the multicast packet; and sending a replica packet to each hardware forwarding element in a second set of forwarding elements comprising at least two hardware forwarding elements from which the multicast packet was not received.

13. The non-transitory machine readable medium of claim 12, wherein a hardware forwarding element in the second set of forwarding elements outputs the multicast packet to at least one port of the hardware forwarding element when the hardware forwarding element identifies the at least one port as being connected to a machine that is a part of the particular virtual network.

14. The non-transitory machine readable medium of claim 9, wherein each hardware forwarding element receives the forwarding instructions to generate at least one flow to forward a known unicast packet directly to another forwarding element in the particular virtual network.

15. The non-transitory machine readable medium of claim 9, wherein each hardware forwarding element forwards a multicast packet directly to a software forwarding element in the particular virtual network from which the hardware forwarding element did not receive a multicast packet.

16. The non-transitory machine readable medium of claim 9, wherein the service node module further comprises sets of instructions for:

receiving an Address Resolution Protocol (ARP) packet from a forwarding element in the plurality of forwarding elements replicating the ARP packet; and sending a replica ARP packet to a second set of forwarding elements comprising at least two forwarding elements from which the service node did not receive the ARP packet.

17. A non-transitory machine readable medium storing a service node module which when executed by at least one processing unit of a computer forwards packets through a network, the service node module comprising sets of instructions for:

receiving a multicast packet for a particular virtual network sent from a forwarding element in a plurality of forwarding elements that implements a virtual network, the plurality of forwarding elements comprising hardware and software forwarding elements;

replicating the packet; and sending a replica of the multicast packet to each hardware forwarding element in a first set of forwarding elements comprising each hardware forwarding element from which the service node did not receive the multicast packet, wherein a hardware forwarding element in the first set of forwarding elements outputs the multicast packet to at least one port of the hardware forwarding element when the hardware forwarding element identifies at least one port as being connected to a machine that is a part of the particular virtual network.

18. The non-transitory machine readable medium of claim 17, wherein the first set of forwarding elements includes only hardware forwarding elements.

19. The non-transitory machine readable medium of claim 17, wherein each hardware forwarding element forwards a multicast packet directly to each software forwarding element in the particular virtual network from which the multicast packet did not originate.

20. The non-transitory machine readable medium of claim 17, wherein the service node module further comprises sets of instructions for:

receiving an Address Resolution Protocol (ARP) packet from a forwarding element in the plurality of forwarding elements replicating the ARP packet; and sending a replica ARP packet to a second set of forwarding elements comprising at least two forwarding elements from which the service node did not receive the ARP packet.

* * * * *